United States Patent [19]

Farla et al.

[11] Patent Number: 5,001,692

[45] Date of Patent: Mar. 19, 1991

[54] OPTICAL RECORDING SYSTEM PROVIDING A RECORDING SIGNAL WAVEFORM ADAPTED TO THE RECORDING CHARACTERISTICS OF THE RECORD CARRIER, AND RECORDING APPARATUS AND RECORD CARRIER FOR USE IN SUCH SYSTEMS

[75] Inventors: Martin A. J. P. Farla, Nuenen; Henricus T. L. P. Stockx, Someren; Johannes J. Mons, Eindhoven; Wilhelmus P. M. Raaymakers, Bois-le-Duc; Fransiscus L. J. M. Kuijpers, Eindoven, all of Netherlands

[73] Assignees: U.S. Philips Corporation, Philips DuPont. both of New York, N.Y.

[21] Appl. No.: 538,587

[22] Filed: Jun. 14, 1990

Related U.S. Application Data

[63] Continuation of Ser. No. 179,107, Apr. 8, 1988, abandoned.

[30] Foreign Application Priority Data

Apr. 21, 1987 [NL] Netherlands ............................ 8700934
Jan. 29, 1988 [NL] Netherlands ............................ 8800223

[51] Int. Cl.$^5$ ................................................. G11B 7/00
[52] U.S. Cl. ........................................ 369/48; 369/116
[58] Field of Search .................. 369/48, 49, 50, 111, 369/116, 278, 292, 124, 275.1, 275.4, 59

[56] References Cited

U.S. PATENT DOCUMENTS

| | | | |
|---|---|---|---|
| 4,488,277 | 12/1984 | McFarlane et al. | 369/48 |
| 4,538,257 | 8/1985 | Klinger | 369/54 |
| 4,796,250 | 1/1989 | Kobayashi et al. | 369/116 |
| 4,841,506 | 6/1989 | Kiyoura et al. | 369/32 |
| 4,873,680 | 10/1989 | Chung et al. | 369/116 |

FOREIGN PATENT DOCUMENTS

| | | | |
|---|---|---|---|
| 59-42653 | 3/1984 | Japan | 369/275 |
| 59-60742 | 4/1984 | Japan | . |
| 60-160082 | 8/1985 | Japan | 369/292 |
| 61-180935 | 8/1986 | Japan | 369/48 |
| 61-243974 | 10/1986 | Japan | . |
| 61-260438 | 11/1986 | Japan | . |
| 61-260439 | 11/1986 | Japan | . |

*Primary Examiner*—Donald McElheny, Jr.
*Attorney, Agent, or Firm*—Leroy Eason

[57] ABSTRACT

An optical recording system wherein the record carrier is pre-recorded with adjustment information indicative of the waveform of the write signal ($V_s$) to be employed for recording an information signal ($V_i$) thereon. The recording apparatus includes a read/write head for reading the adjustment information before recording, and a control circuit for deriving the write signal ($V_s$) from the information signal ($V_i$). The control circuit includes an adjustment circuit which selects a write signal waveform in conformity with the adjustment information read from the record carrier.

16 Claims, 9 Drawing Sheets

| $a_1$ | $a_2$ | $a_3$ | $a_4$ | $a_5$ | $a_6$ | $a_7$ | $a_8$ | $D_0$ | $D_1$ | $D_2$ | $D_3$ |
|---|---|---|---|---|---|---|---|---|---|---|---|
| X | X | X | X | X | X | X | 0 | 0 | 0 | 0 | 0 |
| X | X | X | X | X | X | 0 | 1 | 0 | 0 | 0 | 1 |
| X | X | X | X | X | 0 | 1 | 1 | 0 | 0 | 1 | 0 |
| X | X | X | X | 0 | 1 | 1 | 1 | 0 | 0 | 1 | 1 |
| X | X | X | 0 | 1 | 1 | 1 | 1 | 0 | 1 | 0 | 0 |
| X | X | 0 | 1 | 1 | 1 | 1 | 1 | 0 | 1 | 0 | 1 |
| X | 0 | 1 | 1 | 1 | 1 | 1 | 1 | 0 | 1 | 1 | 0 |
| 0 | 1 | 1 | 1 | 1 | 1 | 1 | 1 | 0 | 1 | 1 | 1 |
| 1 | 1 | 1 | 1 | 1 | 1 | 1 | 1 | 1 | 1 | 1 | 1 |

FIG.9

| ADRES | | | Vs | |
|---|---|---|---|---|
| 0 0 | — | 0 4 | Vs | 3 |
| 1 0 | — | 1 5 | Vs | 4 |
| 2 0 | — | 2 6 | Vs | 5 |
| 3 0 | — | 3 7 | Vs | 6 |
| 4 0 | — | 4 8 | Vs | 7 |
| 5 0 | — | 5 9 | Vs | 8 |
| 6 0 | — | 6 A | Vs | 9 |
| 7 0 | — | 7 B | Vs | 10 |
| F 0 | — | F C | Vs | 11 |

FIG.10

| | | | | | |
|---|---|---|---|---|---|
| Sync | 00 00 00 00<br>11 11 11 11<br>11 11 11 11 | 11 11 11 11<br>11 11 11 11<br>11 11 11 11 | 11 11 11 11<br>11 11 11 11<br>11 11 11 11 | 11 11 11 11<br>11 11 11 11<br>00 00 00 00 00 | 1<br>2<br>3 |
| Adres | AC 1 | AC 2 | AC 3 | AC 4 | 4 |
| Vs 3 | S 3.1<br>0<br>0<br>0 | S 3.2<br>0<br>0<br>0 | S 3.3<br>0<br>0<br>0 | S 3.4<br>0<br>0<br>0 | 5<br>6<br>7<br>8 |
| Vs 4 | S 4.1<br>S 4.5<br>0<br>0 | S 4.2<br>0<br>0<br>0 | S 4.3<br>0<br>0<br>0 | S 4.4<br>0<br>0<br>0 | 9<br>10<br>11<br>12 |
| Vs 5 | S 5.1<br>S 5.5<br>0<br>0 | S 5.2<br>S 5.5<br>0<br>0 | S 5.3<br>0<br>0<br>0 | S 5.4<br>0<br>0<br>0 | 13<br>14<br>15<br>16 |
| Vs 6 | S 6.1<br>S 6.5<br>0<br>0 | S 6.2<br>S 6.6<br>0<br>0 | S 6.3<br>S 6.7<br>0<br>0 | S 6.4<br>0<br>0<br>0 | 17<br>18<br>19<br>20 |
| Vs 7 | S 7.1<br>S 7.5<br>0<br>0 | S 7.2<br>S 7.6<br>0<br>0 | S 7.3<br>S 7.7<br>0<br>0 | S 7.4<br>S 7.8<br>0<br>0 | 21<br>22<br>23<br>24 |
| Vs 8 | S 8.1<br>S 8.5<br>S 8.9<br>0 | S 8.2<br>S 8.6<br>0<br>0 | S 8.3<br>S 8.7<br>0<br>0 | S 8.4<br>S 8.8<br>0<br>0 | 25<br>26<br>27<br>28 |
| Vs 9 | S 9.1<br>S 9.5<br>S 9.9<br>0 | S 9.2<br>S 9.6<br>S 9.10<br>0 | S 9.3<br>S 9.7<br>0<br>0 | S 9.4<br>S 9.8<br>0<br>0 | 29<br>30<br>31<br>32 |
| Vs 10 | S 10.1<br>S 10.5<br>S 10.9<br>0 | S 10.2<br>S 10.6<br>S 10.10<br>0 | S 10.3<br>S 10.7<br>S 10.11<br>0 | S 10.4<br>S 10.8<br>0<br>0 | 33<br>34<br>35 |
| Vs 11 | S 11.1<br>S 11.5<br>S 11.9<br>0 | S 11.2<br>S 11.6<br>S 11.10<br>0 | S 11.3<br>S 11.7<br>S 11.11<br>0 | S 11.4<br>S 11.8<br>S 11.12<br>0 | 64<br>65<br>66<br>67 |
| | | | | | 587<br>587<br>588 |

FIG. 12

OPTICAL RECORDING SYSTEM PROVIDING A RECORDING SIGNAL WAVEFORM ADAPTED TO THE RECORDING CHARACTERISTICS OF THE RECORD CARRIER, AND RECORDING APPARATUS AND RECORD CARRIER FOR USE IN SUCH SYSTEMS

This is a continuation of application Ser. No. 179,107, filed Apr. 8, 1988 now abandoned.

BACKGROUND OF THE INVENTION

1. Field of the Invention

The invention relates to a system for recording an information signal on an optical readable record carrier, the recording being in the form of a pattern of recording marks having modified optical properties, which pattern represents the information signal. The recording apparatus comprises a control circuit for converting the information signal in conformity with a specific relationship into a series of consecutive write signals which form the consecutive recording marks having modified optical properties. As used herein, the term "optical" as applied to record carriers and properties thereof also includes magneto-optical record carriers having magneto-optical properties.

The invention further relates to a record carrier for use in the system.

2. Description of the Related Art

Such a system, record carrier and recording apparatus are known from U.S. Pat. No. 4,473,829, assigned to the present assignee, which is incorporated herein by reference.

In such known system the recording marks are formed by means of an optical write head which generates a laser beam which scans a recording layer of a radiation-sensitive material on the record carrier. To form recording marks the laser beam is modulated in conformity with write signals whose signal waveforms depend on the dimensions of the recording marks to be formed and the properties of the record-carrier material. The known system has the drawback that the write signals are optimized for recording on recording layers of "ablative" recording materials only, such a material being removed from the recording layer under the influence of the radiation energy supplied by means of the laser beam. However, when recordings are made on other types of radiation-sensitive recording layers, other write signal waveforms are preferable. As is described in the prior but non-prepublished Netherlands Patent Application No. 8602718 filed Oct. 29, 1986, which corresponds to U.S. Pat. No. 4,774,522, issued Sept. 27, 1988 on an application filed Mar. 12, 1987, assigned to the present assignee, which U.S. patent is incorporated herein by reference, the write signal waveforms required for making recordings on "phase-change" and "thermo-optical" materials are completely different than in the case of recording on "ablative" materials, as a result of specific thermal effects produced in the recording layer during recording. Moreover, the thermal effects for different materials of the same type also differ from each other, so that the optimum write signal waveforms for different materials of the same type may also be different.

SUMMARY OF THE INVENTION

It is an object of the invention to provide a recording system which enables record carriers having recording layers of different types of materials to be inscribed by means of write signal waveforms which are adapted to the type of recording layer employed.

In accordance with the invention this object is achieved for a system of the type defined in the opening paragraph in that the record carrier is pre-recorded with readable adjustment information which is indicative of the write signal waveforms required for the relevant record carrier material, and in that the recording apparatus comprises a read device for reading such adjustment information on the record carrier during a time interval prior to recording the information signal. The recording apparatus further comprises an adjustment circuit for adjusting the write signal waveforms in conformity with the read-out adjustment information, by adapting the relationship between the write signals and the information signals.

Thus, prior to recording the write signal waveforms are always adapted automatically to the record carrier then present in the recording apparatus.

It is to be noted that published European Patent Application EP No. 0,144,436 describes a recording system for recording a binary information signal on record carriers with a positive write polarity, on which recording marks having a higher reflectivity than the surrounding area are produced by exposure to a laser beam, and also on record carriers with a negative write polarity, on which recording marks with a lower reflectivity than the surrounding area are produced by exposure to the laser beam. The recording apparatus comprises a detector for detecting a mark on the record carrier to determine the write polarity of the relevant record carrier.

Depending on the result of the detection the information signal is applied to the write head in inverted or non-inverted form. On record carriers with positive write polarity portions of the information signal having high signal values are recorded as recording marks with a high reflectivity, and on record carriers with negative write polarity portions of the information signal having low signal values are recorded as recording marks with a low reflectivity. Consequently, for both types of record carriers substantially the same recording pattern is formed on the record carrier. However, in this known recording system the waveforms of the write signals for forming high-reflectivity recording marks on the record carriers with positive write polarity are identical to the write signal waveforms for forming low-reflectivity recording marks of corresponding dimensions on record carriers with negative write polarity. This means that the write signal waveform for forming a high-reflectivity recording mark of a specific dimension is identical to the write signal waveform for forming a low reflectivity recording mark of the same dimensions.

If the system is intended for recording an EFM signal in conformity with prevailing CD-Audio or CD-ROM standards it is advantageous to include the recording adjustment information in the subcode Q-channel signal of an EFM signal which is recorded in a predetermined track portion, for example a lead-in track or lead-out track, by means of a preformed information structure. In the lead-in track the Q-channel signal indicates the positions where specific track portions begin, an 8-bit code "point" indicating a track number, and an address code (PMIN, PSEC, PFRAME) indicating the beginning or the end of the track portion specified by the track number. The number of 8-bit codes needed for track numbers is smaller than the number of possible codes. Thus it becomes possible to indicate that instead of address information the Q-channel signal includes adjustment information that has been recorded by means of a unique bit combination of the 8-bit code "point".

If the adjustment information is recorded in this way it can also be read in a simple manner by recovering the sub code Q-channel signal from the EFM signal by means of an EFM subcode demodulator and subsequently extracting the adjustment information from the remainder of the Q channel signal by detection of the unique bit combination.

It is to be noted that for controlling readout of a recorded standard CD signal the address information in the subcode Q-channel is utilized, so that in a combined recording/read apparatus for CD signals the same EFM subcode demodulator can be used for reading the adjustment information during recording and also for reading the address information for controlling the read process, which means that the electronic circuitry is used very efficiently.

An embodiment of the system is characterized in that the write signals comprise trains of pulses to form recording marks comprising sequences of overlapping recording sub-marks, the adjustment information being utilized to adjust the pulse trains depending on the adjustment information being read. This embodiment is very suitable for recording EFM-modulated signals recorded by means of a scanning beam whose diameter is larger than the length on the record carrier corresponding to one EFM channel bit. By an appropriate choice of the pulse trains used as write signals it is possible to compensate effectively for the influence of thermal effects for different types of optical record carriers, as is described in, for example, the aforementioned Netherlands Patent Application No. 8602718 and corresponding U.S. Pat. No. 4,774,522. The advantage of such a write signal waveform is that it can be generated simply. Moreover, the characteristics of such signal waveforms can be expressed simply in a binary code, enabling them to be stored simply in a memory or to be defined by means of a digital electronic circuit.

An attractive embodiment of the system for recording an information signal comprising binary bit cells is characterized further in that the control circuit comprises a detector circuit for detecting a succession of bit cells of the same logic value and for supplying a detection signal which is representative of the number of bit cells in the detected series. A write signal generator generates, in response to the detection signals, write signals in conformity with a specific relationship between the write signals and the detection signals, such relationship being in accordance with the adjustment information on the record carrier signifying the required relationship between the write signals and the detection signals for the relevant record. An adjustment circuit establishes the relationship in conformity with the adjustment information read from the record carrier.

In this embodiment of the system the write signal is derived from the information signal in two steps; namely a first step which is independent of the type of recording material and in which the detection signal is derived, and a second step which is dependent upon the type of recording material and in which the write signal waveform is established in dependence upon the detection signal. This has the advantage that the relationship between the information signal and the write signals can be adapted very simply to the recording material of the record carrier.

Another attractive embodiment of the system is characterized in that the write signal generator comprises a memory for the storage of different write signals and means for supplying one of the stored write signals depending on the detection signal, and in that the adjustment circuit comprises a circuit for loading the memory with the write signals in conformity with the adjustment information read.

The use of the memory enables the control circuit to be adapted to deliver an optimum write signal waveform for recording marks any size.

Another embodiment of the system is characterized in that the adjustment information on the record carrier comprises the write signals required for the relevant record carrier material, and in that the adjustment circuit is adapted to load the memory with the write signals provided by the adjustment information.

This embodiment has the advantage that record carriers having novel recording materials to be inscribed by means of write signal waveforms and which are still unknown can readily be used in the system. This merely necessitates the storage of the desired new write signal waveforms on the record carrier having the novel recording material.

BRIEF DESCRIPTION OF THE DRAWINGS

Further embodiments of the invention and further advantages thereof will now be described in more detail, by way of example, with reference to FIGS. 1 to 18, of which:

FIG. 9 illustrates the relationship between the input and output signals of the encoding circuit for use in the control circuit, FIG. 10 shows the addresses of the write signals stored in the memory of the control circuit, FIG. 12 shows how the desired write signals are arranged in a data block stored on the record carrier.

DESCRIPTION OF THE PREFERRED EMBODIMENTS

Figure 1:
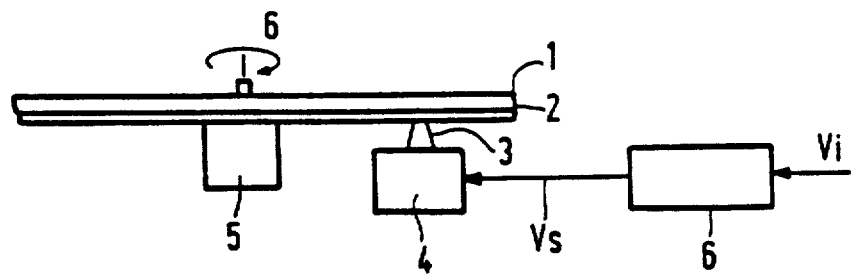
FIG. 1 shows a prior-art recording system.

FIG. 1 shows a conventional system for optical recording of an information signal Vi, as is described in for example said U.S. Pat. No. 4,473,829. The system comprises an optical record carrier 1 provided with a radiation-sensitive recording layer 2. A drive means 5 rotates the record carrier 1 relative to a write head 4 about an axis 6. The write head 4 is adapted to direct to the recording layer 2 a radiation beam 3 of sufficient energy to bring about a change in optical properties of the recording layer 2 at the location where the beam is incident on this recording layer 2. The radiation beam 3 can be modulated with write signals Vs, which are derived from the information signal Vi to be recorded by means of a control circuit 6 in accordance with a specific relationship.

Figure 2:
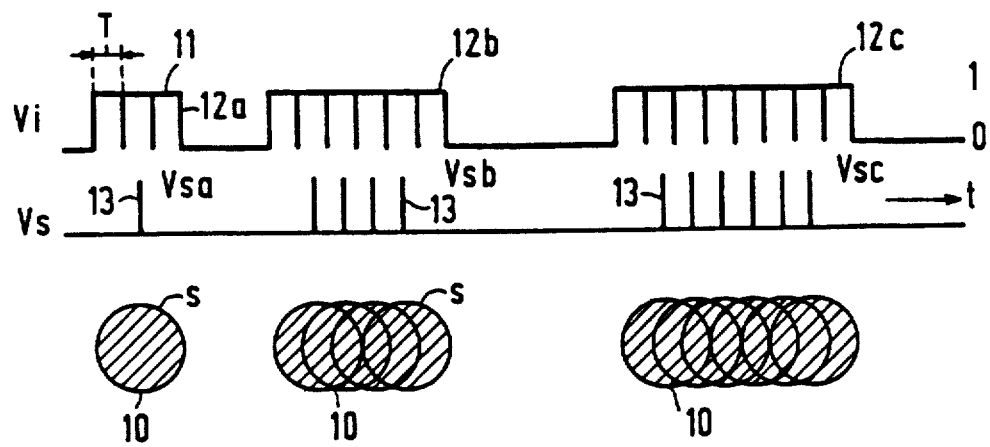
FIGS. 2 and 3 illustrate known suitable relationships between the information signal and the write signals for recordings on recording materials of the "ablative" and of the "phase change" type.

FIG. 2 shows the information signal Vi, the write signals Vs and the recording marks 10 for recording on a recording layer of an "ablative" recording material. The information signal Vi is an EFM-modulated signal, for example in conformity with prevailing CD-Audio or CD-ROM standards. Such a signal comprises binary bit cells 11 of constant duration T. The number of successive bit cells of the same logic value is minimum three and maximum eleven in an EFM modulated signal. For the contiguous groups 12a, 12b and 12c of bit cells of the logic value "1" the control circuit 6 generates write signals Vsa, Vsb and Vsc respectively. Each of the write signals comprises one write pulse for every three successive such bit cells. In response to every write pulse 13 the write head 4 generates a radiation pulse. As a result of each radiation pulse 13 the ablative recording material is removed at the location where the radiation beam 3 is incident on the recording layer 2, thus producing a unitary recording mark s having modified optical properties in the recording layer 2. In the example illustrated in FIG. 2 the dimension of a unitary recording mark s corresponds to said minimum length of three bit cells. The write signal Vsa for forming a recording mark 10 corresponding to the minimum number of three bit cells of a logic value "1" comprises only one write pulse 13. The recording marks 10 corresponding to a larger number of bit cells comprise a plurality of overlapping unitary recording sub-marks s, which are formed by means of write signals comprising a sequence of write pulses 13 which are shifted relative to one another by a time interval corresponding to the bit cell length T.

Figure 3:
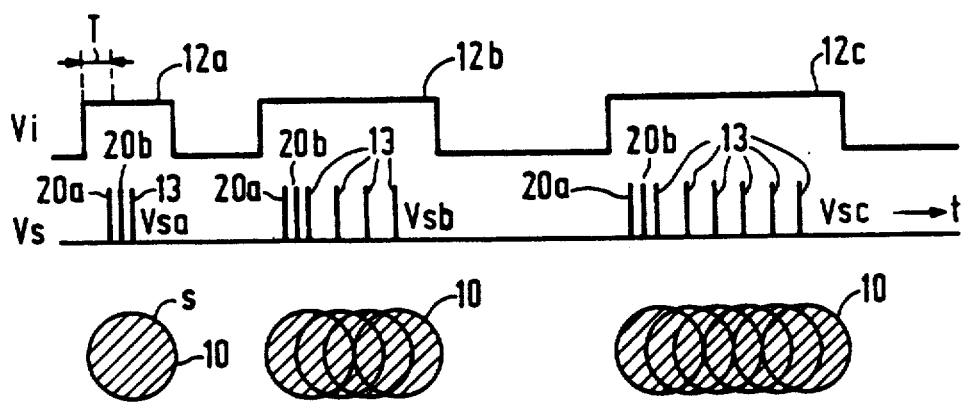

FIG. 3 illustrates a suitable relationship between the information signal Vi and the write signals Vsa, Vsb and Vsc for recording on "phase-change" recording materials, as is described in, for example, the said Netherlands Patent Application No. 8602718 and corresponding U.S. Pat. No. 4,774,522. When making a recording on such materials it is desirable, on account of thermal effects occurring within the recording layer during recording, to utilize different write signal waveforms for forming different recording marks 10, additional leader pulses 20a and 20b being generated prior to the formation of the first unitary recording mark s. It is to be noted that the position and the number of leader pulses depend on the "phase-change" recording material being used.

Figure 4:
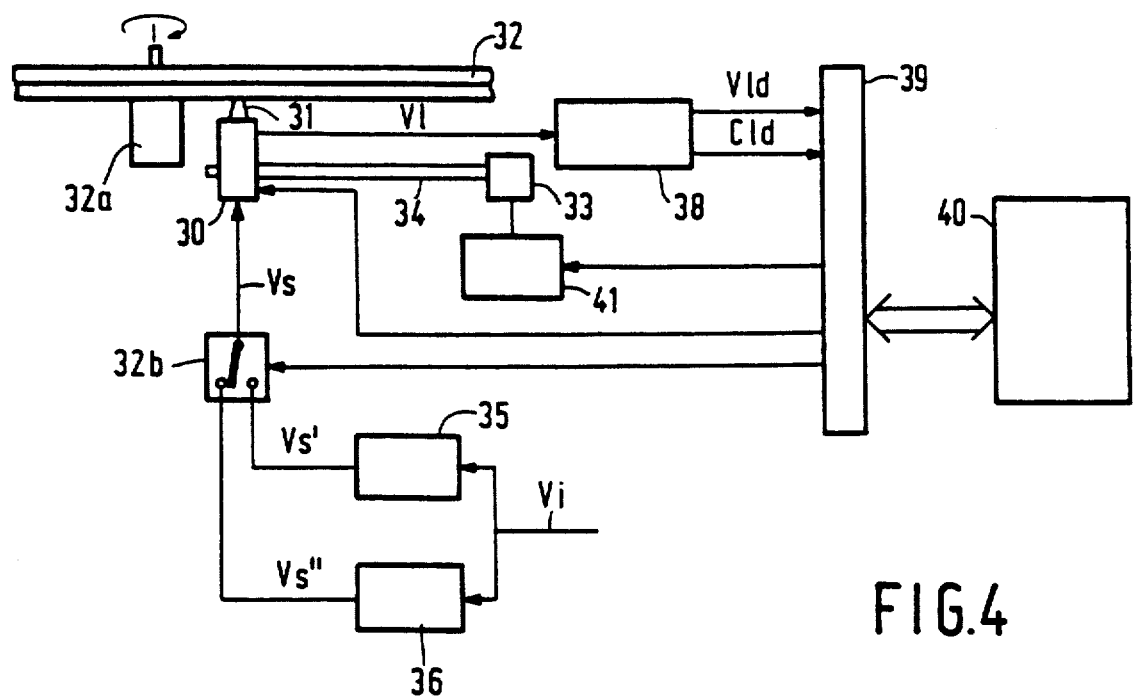
FIG. 4 shows a first embodiment of the recording system in accordance with the invention.

FIG. 4 shows a first embodiment of the recording system in accordance with the invention. The recording system comprises an optical write/read head 30 for scanning an inscribable record carrier 32 by means of a radiation beam 31, which record carrier is rotated with a substantially constant tangential velocity relative to the write/read head 30 by means of a motor 32a. The write/read head 30 is of a customary type, which can be operated in a read mode, in which the intensity of the radiation beam 31 is not high enough to bring about an optical change in the recording layer of the record carrier 32, and a write mode, in which the radiation beam is modulated in conformity with the write signals Vs and the intensity of the modulated radiation beam 31 is adequate to bring about an optical change in the recording layer of the record carrier 32. By means of a motor 33 and a spindle 34 the write/read head 30 can be moved in a radial direction relative to the record carrier 32. The motor 33 is energized by a motor-control circuit 41. A first control circuit 35 converts the information signal Vi into a sequence of write signals Vs' suitable for recording on ablative recording material. Such a control circuit 35, which is adapted to ablative recording and which converts the information signal into write signals Vs in conformity with the relationship illustrated in FIG. 2, is described in detail in the aforementioned U.S. Pat. No. 4,473,829. A second control circuit 36 converts the information signal Vi into write signals Vs" suitable for recording on "phase-change" recording materials. Such a control circuit 36, which is adapted to record on "phase-change" recording materials and which converts the information signal into write signals in conformity with the relationship illustrated in FIG. 3, is described comprehensively in said Netherlands Patent Application No. 8602718 and corresponding U.S. Pat. No. 4,774,522. By means of an electronically actuated switch 32b either the write signals Vs' or the write signals Vs" are selected for modulating the write beam 31 in the write mode. For controlling the selection of write signals the record carrier is provided with adjustment information which indicates whether the relevant record carrier 32 must be inscribed by means of write signals Vs' or write signals Vs". This adjustment information is prerecorded as an information structure at a predetermined location on the record carrier.

Figure 5A:
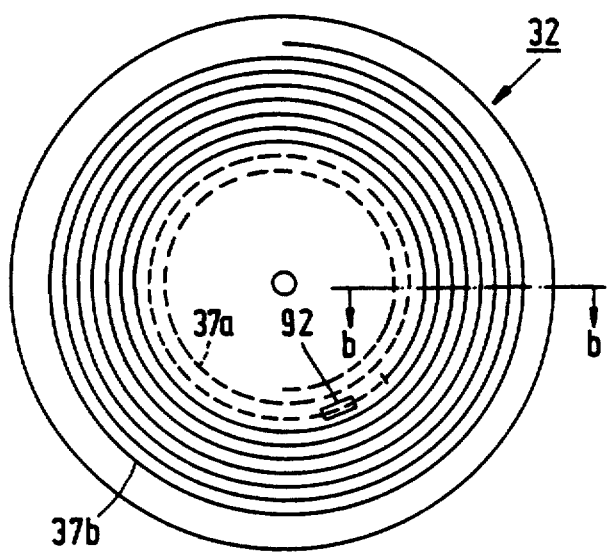
FIG. 5a is a plan view of a record carrier for use in the recording system in accordance with the invention
Figure 5B:
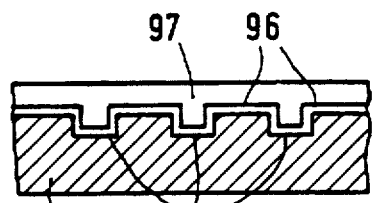
FIG. 5b is a cross-section thereof.

FIG. 5a is a plan view of shows an embodiment of the record carrier 32 on which the adjustment information has been recorded at a predetermined location. FIG. 5b shows a small part of the sectional view taken on the line b—b in FIG. 5a. The record carrier 32 has a preformed track, for example a preformed groove or ridge of which a portion 37b is intended for recording the information signal. For the purpose of recording the record carrier 32 has a recording layer 96 deposited on a transparent substrate 95 and covered with a protective layer 97. The recording layer 96 is of a material which when exposed to suitable radiation is subjected to an optically detectable change. A survey of such materials is given in the book "Principles of optical disc systems", Adam Hilgar Ltd., Bristol and Boston, pages 210-227.

The reference numeral 37a indicates a lead-in portion of the track which precedes the beginning of the portion 37b intended for recording the information signal.

Figure 5C:
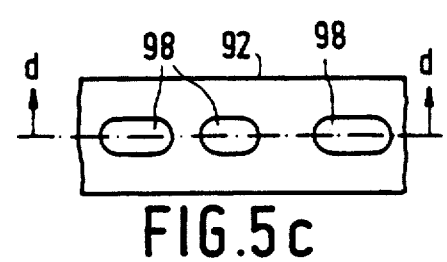
FIG. 5c is an enlargement of a portion of a track of the record carrier in FIG. 5a, and FIG. 5d is a cross-section of the track portion shown in FIG. 5c.

In the present embodiment of the record carrier 32 the adjustment information is recorded as a pattern of preformed pits, a part 92 of the lead-in track 37a formed with such pits 98 being shown to a strongly enlarged scale in FIG. 5c.

Figure 5D:
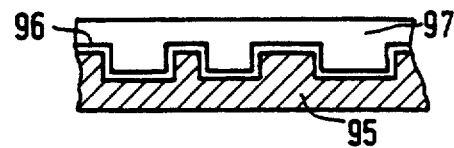

FIG. 5d shows the track the part 92 in a sectional view taken on the line d—d.

It is to be noted that for the sake of clarity the distance between the turns of the spiral track 37a, b has been exaggerated strongly. In a practical example of the record carrier 32 the distance between the track turns is 1 to 2 μm for a track width of 0.4–1.3 μm.

Figure 6:
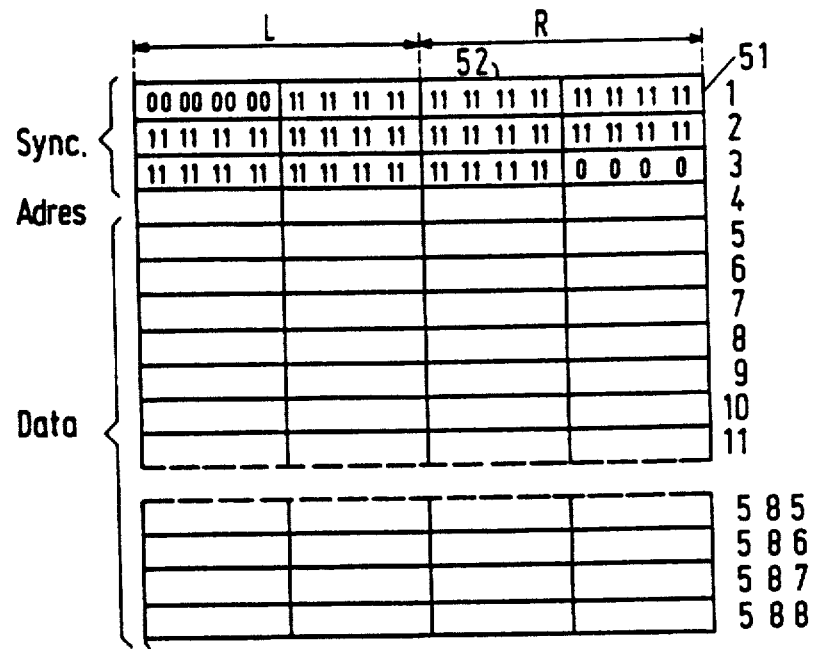
FIG. 6 shows a suitable format for the storage of the adjustment information on the record carrier.

After a new record carrier 32 has been placed in the recording apparatus the read/write head 30 is brought to a position opposite the lead-in track 37a and reads the adjustment information is. This adjustment information may be recorded in the lead-in track 37a, for example, in conformity with the CD-ROM format. In accordance with this CD-ROM format digital data is recorded in blocks (see FIG. 6), each block comprising 588 rows 51 of four eight-bit bytes 52 each. The first three rows of each block store a specific 12-byte synchronization code. The fourth row is reserved for a four-byte block-address code. The other rows are reversed for data storage. The adjustment information can be arranged in a block with a unique block address. For the purpose of reading the adjustment information stored in lead-in track 37a the recording apparatus is provided with read circuit 38 coupled to the write/read head 30 for converting the read signal Vl supplied by the optical read/-write head 30 in the read mode into a digital information signal Vld comprising the consecutive bytes of the blocks 50 being read. The read circuit 38 is of a customary type as employed, for example, in the commercially available Philips Compact Disc Rom system CM100/25, CM100/30, CM110/25 or CM110/30. Such a read circuit supplies the read-out data bytes in the form of a serial bit stream which is in synchronism with a clock signal cld, which is also supplied by the read circuit. The data bytes supplied by the read circuit are applied to a microcomputer system 40 by means of a customary interface circuit 39.

Adjustment of the write signal waveforms proceeds as follows. After a new record carrier 32 has been placed in the recording apparatus the microcomputer system 40 performs a starting program. During the execution of the starting program the read/write head 30 is set to the read mode via the interface circuit 39. Moreover, under control of the microcomputer system 40 the read/write head 30 is positioned relative to the lead-in track 37a. During reading of the lead-in track 37 the block with the adjustment information is detected by means of the unique block-address code and is subsequently read. After this, the microcomputer system 40 sets the electronically actuated switch 32b in conformity with the adjustment information read. After termination of the starting program the read/write head 30 is set to the write mode and the information signal Vi is recorded in the track portion 37b with the write signal waveforms thus selected.

Figure 7:
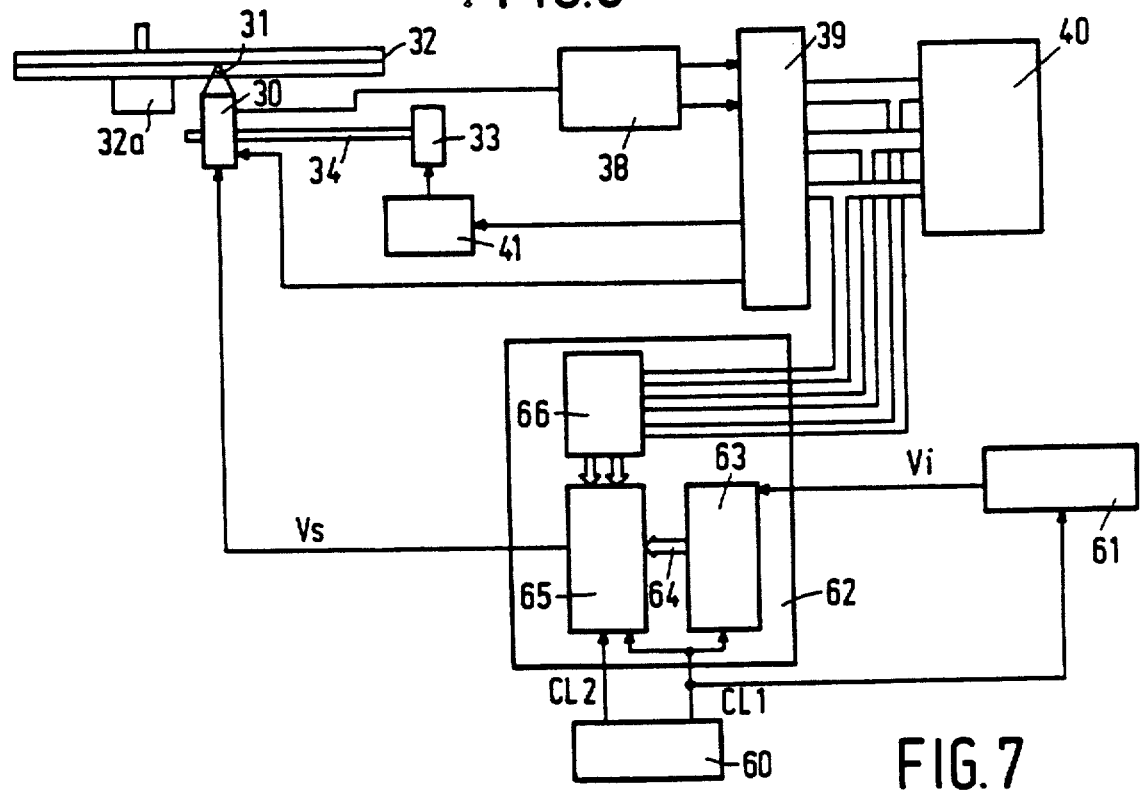
FIG. 7 shows another embodiment of the recording system in accordance with the invention.

FIG. 7 shows another embodiment of a recording apparatus in accordance with the invention. Parts of the recording system corresponding to those of the system shown in FIG. 4 bear the same reference numerals. The recording system further comprises an oscillator system 60 for generating a first clock cl1 and a second clock signal cl2 whose frequency is eight times that of the clock signal cl1. A signal generator 61 supplies the EFM-modulated information signal Vi to be recorded to a control circuit 62 in synchronism with the first clock signal cl1 to convert the information signal Vi into the write signals Vs for the optical read/write head 30. The control circuit 62 comprises a detector circuit 63 for detecting a series of consecutive bit cells of the logic value "1". The detector circuit 63 generates a detection signal in the form of codes representing the number of bit cells in the detected series. As already stated, this number is minimum three and maximum eleven for EFM-modulated signals. The detection signal is applied to a write signal generator 65 via signal lines 64, said generator generating a write signal Vs for each of the different detection signals, to write a recording mark having a length corresponding to the number of bit cells represented by the relevant detection signal. Hereinafter, the write signals for forming recording marks representing series of 3, . . . , 11 contiguous bit cells will be referred to as Vs3, . . . , Vs11 respectively. The recording marks themselves will be referred to briefly as I3 marks, . . . , I11 marks, the numerals 3, . . . , 11 each indicating the number of bit cells represented by these marks. By means of an adjustment circuit 66 connected to the microcomputer system 40 the relationship between the detection signals and the write signals Vs can be selected, in accordance with the adjustment information read from the lead-in track 37a of the record carrier 32 during the starting phase.

Figure 8:
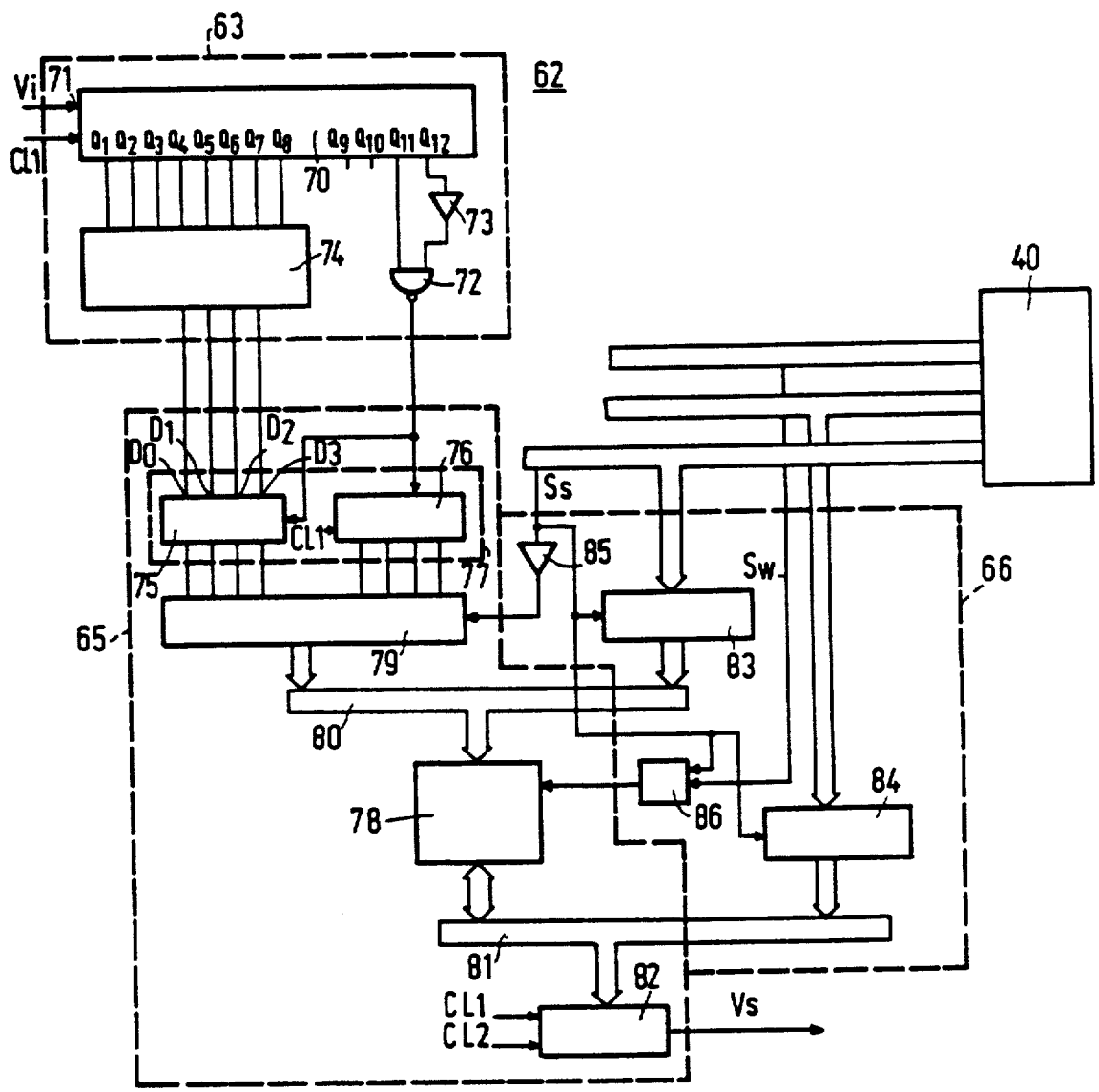
FIG. 8 shows an example of a control circuit for use in the recording system shown in FIG. 7.

FIG. 8 shows an example of the control circuit 62 in detail. The detector circuit 63 used in the control circuit 62 comprises 12-bit shift register 70 to which the information signal Vi to be recorded is applied via a serial data input 71. The clock signal Cl1 is applied to the clock input of the shift register 70. In response to the clock pulse of the clock signal Cl1 the information signal Vi is read into the shift register 70, the information signal delayed by 1, . . . 12 clock pulses appearing respectively on the Q1 . . . Q12 outputs of the shift register 70. The Q11 output of the shift register 70 is applied to a two-input NAND-gate 72. The Q12 output of the shift register 70 is applied to the other input of the NAND gate 72 via an inverter circuit 73. The Q1, . . . , Q8 outputs of the shift register 70 are applied to an encoding circuit 74, which converts the signal values on the outputs of the shift register 70 into detection signals D0, D1, D2 and D3 in conformity with the relationship given in FIG. 9. Such an encoding circuit may comprise, for example, an integrated circuit of the type of 74LS148. The detection signals are applied to a parallel-in parallel-out register 75 which forms part of the write-signal generator 65. Inconjunction with a counter 76 for counting the number of clock pulses of the clock signal Cl1 the register 75 constitutes an address generator 77 for a memory 78, for example a 2k × 8 bit memory of the RAM type. The counter 76 is of a kind which has a reset input for resetting the count to zero and which stops counting if a predetermined final count "15" is reached. The reset input of the counter 76 is connected to the output of the NAND-gate 72. The address on the output of the address generator 77 is applied to the address inputs of the memory 78 via a tristate buffer 79 and an address bus 80. The eight data outputs of the memory 78 are applied to a parallel-serial converter 82 via a data bus 81. The converter 82 is controlled by the clock signal Cl2 applied to the clock input to control the serial data output and by the clock signal Cl1 applied to the load-enable input to control the parallel input of the data applied via the bus 81. The serial output of the converter 82 constitutes the output for the write signal Vs.

Figure 11:
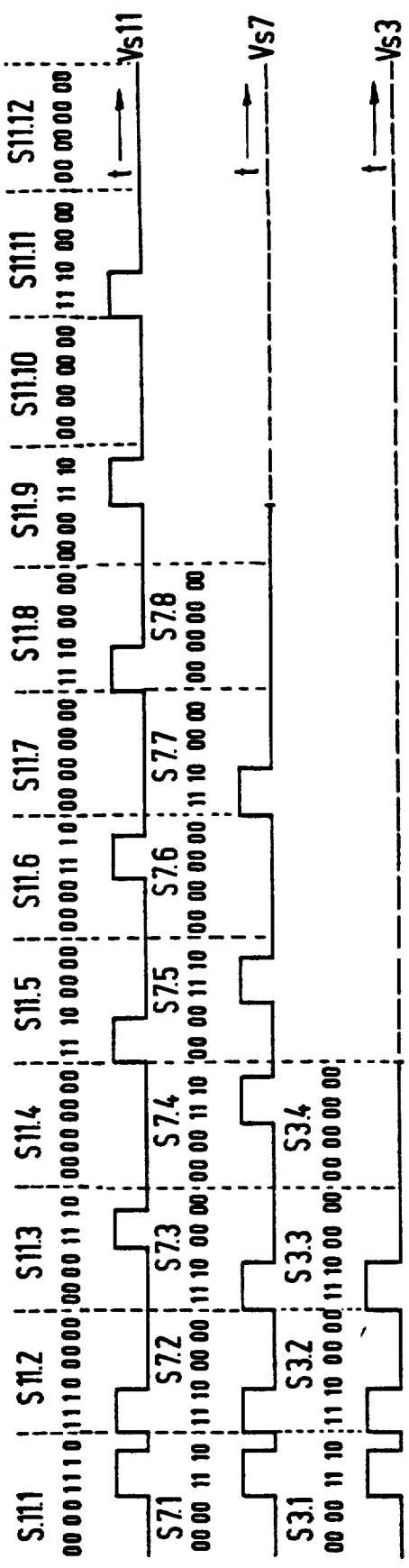
FIG. 11 shows a number of different write signals.
Figure 13:
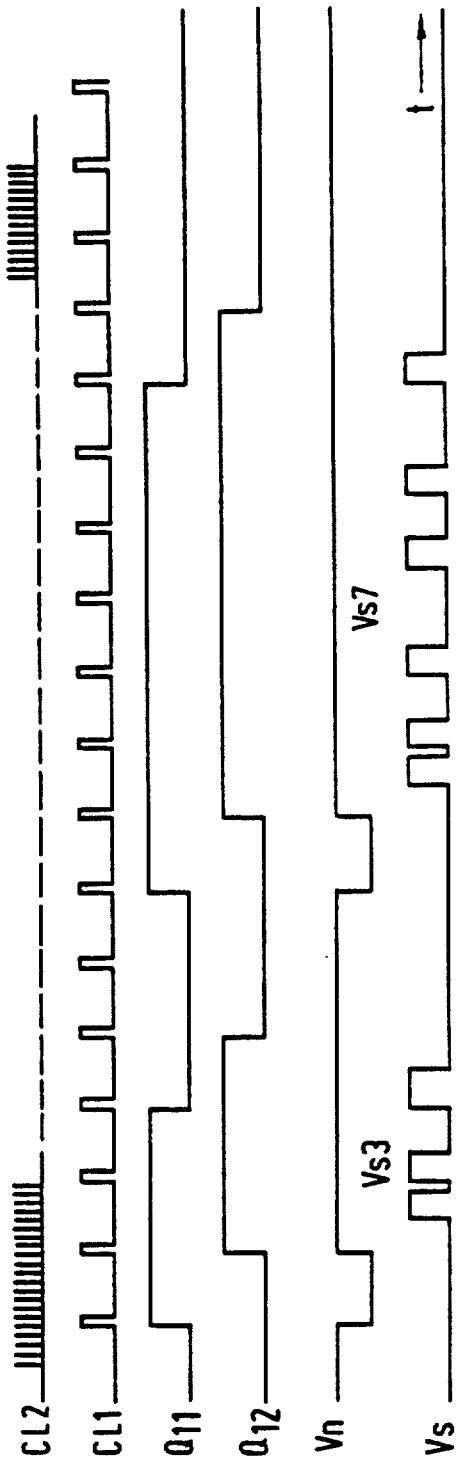
FIG. 13 shows some signals occurring in the control circuit as a function of time.

Conversion of the information signal Vi into write signals Vs proceeds as follows. By means of the inverter circuit 73 and the NAND gate 72 the beginning of the series of consecutive bit cells of a logic value "1" is detected (see FIG. 13). As soon as the beginning of such a series reaches the output Q11 of the shift register 70 the output Vn of the NAND gate 72 becomes "0". The detection signals D0, ..., D3, which at this instant represent the length of the detected series, are loaded into the buffer 75 in response to the 1-0 transition on the output of the NAND gate 72. (It is to be noted once again that the series are at least three bit cells long, so that for determining the detection signals D0, ..., D3 the signal values on the outputs Q9 and Q10 of the register 70 are irrelevant, because they are always "1" at the instant at which the leading end of the series reaches the Q11 output). The counter 76 is also set to zero in response to the 1-0 transition on the output of the NAND gate. Thus, in response to the detection of a series of bit cells of the value "1" the address generator 77 is set to an initial address determined by the length of the detected series. This initial address indicates the first address of a series of consecutive 8-bit storage locations in the memory 78, which stores the write signal for forming a recording mark having a length corresponding to the length of the detected series. FIG. 10 gives the addresses of the storage locations reserved for the storage of the write signals Vs. FIG. 11, by way of example, shows the consecutive bytes Si.j representing the write signals Vs3, Vs7 and Vs11, i indicating to which write signal the relevant byte belongs and j being the sequence number of the byte in the sequence of bytes. The storage locations in which no write signals are stored are loaded with bits of the value "0". In the way described above the storage location in which the first byte of the associated write signal is stored is addressed after detection of a series. Subsequently, inresponse to a pulse of the clock signal, the part of the address supplied by the counter 76 is each time incremented by one until a subsequent series is detected or until the counter has reached its final count "15". Thus, the consecutive bytes representing the desired write signal Vs are each loaded from the memory 78 into the parallel-serial converter 82 and are subsequently converted into a series of binary bit cells constituting the write signal Vs. With the detection circuit 63 and the write-signal generator 65 described above the write signals Vs can be optimized with respect to the recording material in a very simple way by adapting the write signals Vs stored in the memory 78. For each type of record carrier the optimum write signals can be recorded in the lead-in track 37a, in the data block reserved for this purpose in accordance with the CD-ROM format. FIG. 12, by way of example, shows how the bytes Si.j are arranged within the data block. For the arrangement of the bytes S.i.j. shown in FIG. 12 the sequence of the bytes is identical to the sequence in which they must be stored in the memory 78. After the record carrier 32 has been inserted the microcomputer system 40 performs the starting program, during which the read/write head 30 is brought in a position opposite the lead-in track 37a and the information stored in the lead-in track 37a is read. By means of the block addresses the microcomputer system 40 then detects the block address of the block in which the write signals Vs are stored and subsequently loads the memory 78 with the write signals Vs stored in the detected data block via the adjustment circuit 66. For this purpose the adjustment circuit 66 comprises a tri-state buffer 83, which connects the address bus of the microcomputer system 40 to the address inputs of the memory 78 via the address bus 80, and a tri-state buffer 84, which connects the data bus of the microcomputer system 40 to the data inputs of the memory 78 via the bus 81. During loading of the memory 78 the buffers 83 and 84 are enabled by a selection signal Ss from the computer system. The selection signal Ss is also applied to the buffer 79 via an inverter circuit 85, causing the outputs of the tri-state buffer 78 to assume a high-impedance state. Further, a write signal Sw from the microcomputer system 40 is applied to the memory 78 for controlling the loading operation of the memory 78. A gate circuit 86 is arranged in the line supplying the load signal Sw to interrupt the load signal Sw as soon as the buffers 83 and 84 are no longer enabled by the selection signal Ss after termination of the loading process of the memory 78.

In the embodiments described in the foregoing the adjustment information is included in EFM data blocks, recorded in the lead-in track 37a. However, the subcode Q-channel signal of an EFM signal in conformity with the CD standard is also very suitable for recording the adjustment information. This Q-channel signal comprises 98 bits in each EFM subcode frame interleaved with the remainder of the information.

Figure 14:
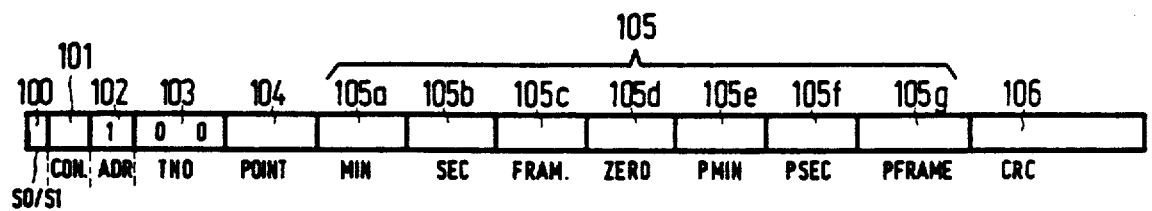
FIG. 14 shows the format of the subcode Q-channel signal of an EFM signal in accordance with a CD standard.

FIG. 14 shows the format of the 98 Q-channel bits of a subcode frame. The 98 bits are divided into one 2-bit group 100, two 4-bit groups 101 and 102, two 8-bit groups 103 and 64, 56-bit groups 105, and one 16-bit group 106. The bits of group 100 are used for synchronising purposes. The bits of group 101 are employed as control bits. In the lead-in track 37a the groups 102 and 103 form a unique bit combination "100" (hexadecimal), which indicates that the relevant track portion forms part of the lead-in track 37a.

By means of 8 bits of group 104 the type of information stored in the group 105 is characterized. This is generally a track number indicating a specific track portion, the address of this portion being specified in group 105.

However, a unique bit combination, for example FF (hexadecimal), indicates that the bits in group 105 represent information on record-carrier parameters. Some of these bits, for example the three most significant bits of subgroup 105f, are used for storing the adjustment information specifying the desired write signal waveform. The other bits of the group 105f may be used for specifying other parameters, for example the desired write intensity.

During scanning of the lead-in track 37a the control information relating to the record-carrier parameters can be extracted simply from the Q-channel bits recovered from the EFM subcode by means of a conventional EFM subcode demodulator.

Figure 15:
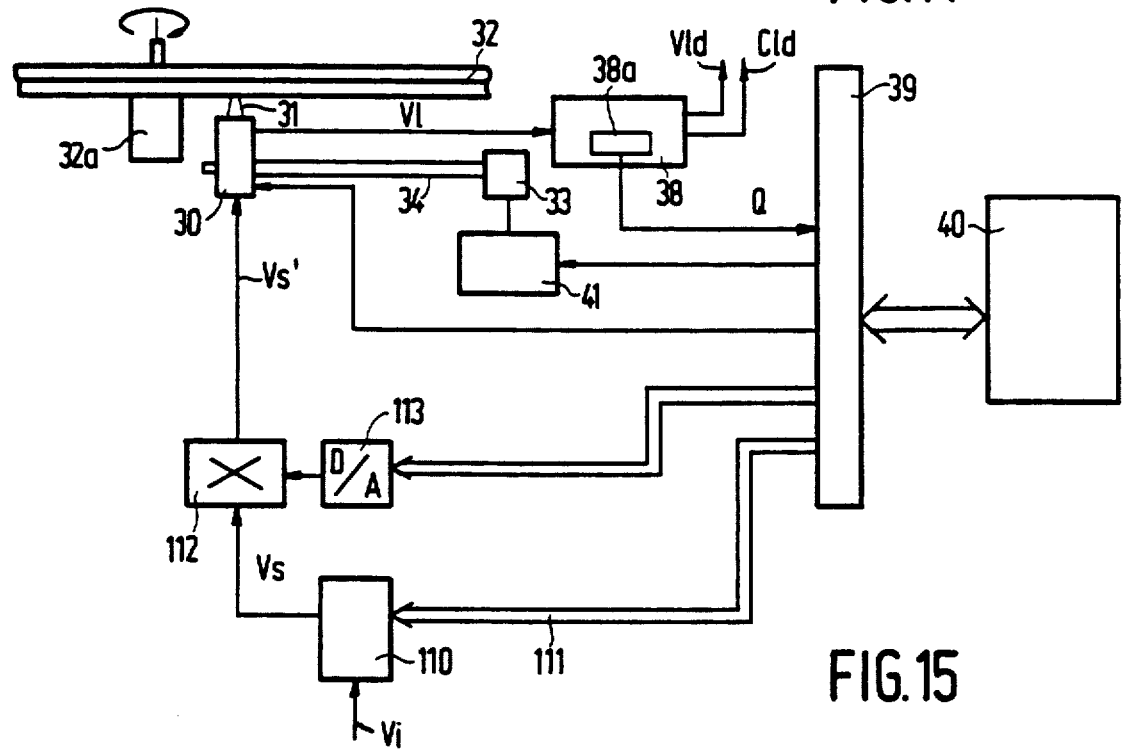
FIG. 15 shows an embodiment of a recording system in accordance with the invention, which is very suitable for recording EFM signals in conformity with prevailing CD standards.

FIG. 15 shows an embodiment of a recording system in accordance with the invention, in which the adjustment information is recovered from the subcode Q-channel signal. Instead of the data signal Vld the subcode Q-channel signal, which is derived from the read signal Vl by means of a subcode demodulator 38a of a customary type in the read circuit 38, is applied to the interface circuit 39.

Figure 16:
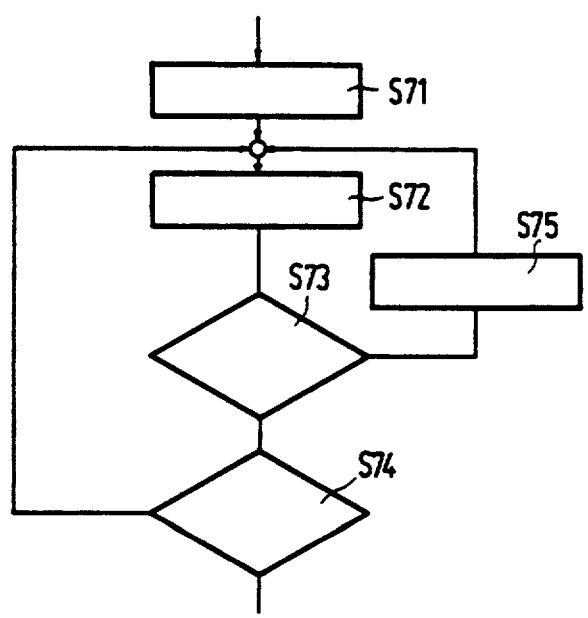
FIG. 16 is a flow chart of a program for a microcomputer system employed in the system of FIG. 15.

FIG. 16 shows a flowchart for extracting the control information from the Q-channel signal. This program is carried out each time that the recording system 10 is put into operation after changing of the record carrier. In step S71 the read/write head 30 is positioned opposite the lead-in track 37a under control of the microcomputer system 40 by means of the motor 33 and the spindle 34. Subsequently, reading of the information recorded in the lead-in track 37a is started.

In step S72 a block of 98 associated Q-channel bits is read and in step S73 it is ascertained by means of the bits of groups 102, 103 and 104 whether adjustment information is stored in the group 105f. If this is so, the information represented by the bits of the group 105f is stored in a memory of the microcomputer system in step S75. The program then proceeds again with step S72, in which a subsequent block of 98 Q-channel bits is read in. If during step S73 it is found that block 105f does not contain any parameter information, step S73 is followed by step S74, in which it is ascertained with the aid of the block of Q-channel bits read in whether the end of the lead-in track 4a is reached. If this is not the case, the program proceeds with step S72. If the end is reached the program is terminated.

For the adjustment of the write signal waveforms the system shown in FIG. 15 comprises a control circuit 110 which converts the EFM modulated signal Vi into write signals Vs having a waveform defined by the adjustment information. For the purpose of adjustment the control circuit 110 is coupled to the microcomputer 40 via a bus 111 and the interface circuit 39. The control circuit 110, which will be described in more detail hereinafter, generates pulse-shaped write signals Vs which are applied to a multiplier circuit 112, in which the write signal is multiplied by a signal appearing on the output of the digital-to-analog converter 113, in order to adjust the desired write intensity of the beam 31. The digital inputs of the digital-to-analog converter 113 are connected to the microcomputer system 40 via a bus 114 and the interface circuit 39.

The output signal Vs' of the multiplier circuit 112 is applied to the read/write head 30, which in response to the pulses on the output of the multiplier produces radiation pulses of an intensity proportional to the magnitude of the applied pulses.

Figure 17:
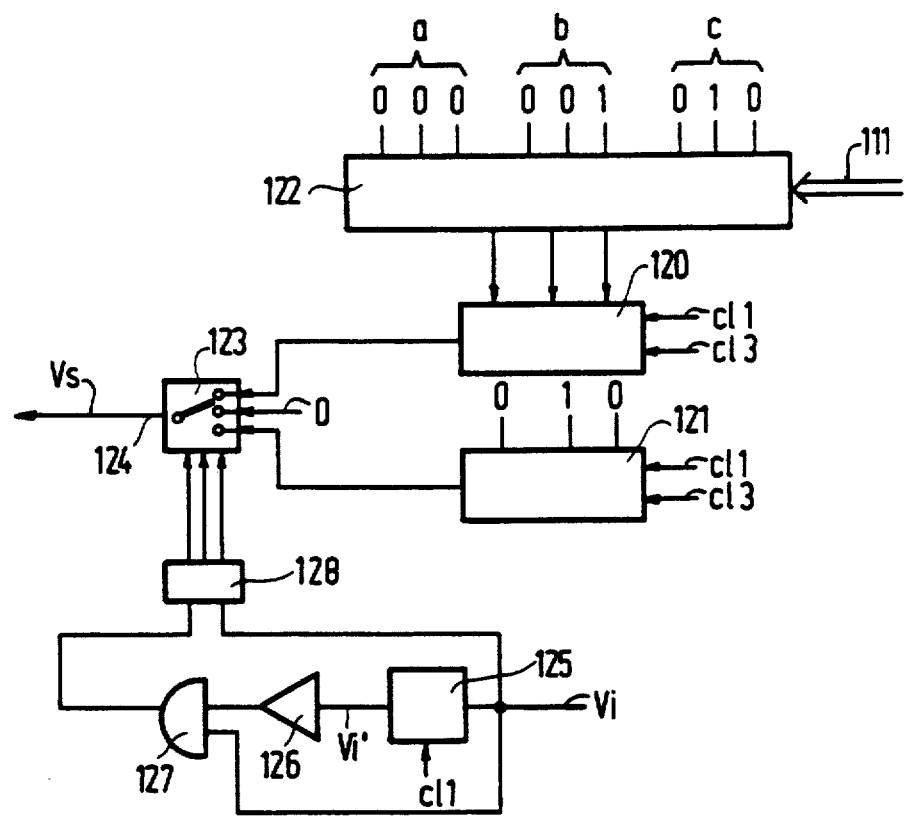
FIG. 17 shows an example of the control circuit for use in the system shown in FIG. 15.

FIG. 17 shows an example of the control circuit 110 for converting the signal Vi into write signals Vs. The control circuit 110 comprises two three-bit parallel-serial converters 120 and 121. The parallel inputs of the converter 120 are connected to the outputs of a 3-channel multiplex circuit 122. A bit combination "000" is applied to input a of the multiplex circuit 122 and bit combinations "001" and "010" are applied to the inputs b and c respectively. The control inputs of the multiplex circuit 122 are connected to the bus 111, so that depending on the adjustment information supplied by the bus 111 one of the three bit combinations "000", "001" or "010" is applied to the parallel inputs of the parallel-serial converter 120.

The bit combination "010" is also applied to the parallel inputs of the parallel-serial converter 121. The parallel-load inputs of the converters 120 and 121 are controlled by means of the clock signal Cl1 whose frequency is equal to the bit frequency of the EFM-modulated signal Vi. The clock inputs for the serial output of the bit combinations in the converters are controlled by a clock signal cl3 of a frequency equal to three times the bit frequency of the signal Vi. The serial outputs of the converters 120 and 121 are respectively fed to a first input and a second input of a 3-channel multiplex circuit 123. A logic "0" signal is applied to the third input of the multiplex circuit 123. The multiplex circuit 123 connects the output 124 of the multiplex circuit 123 to one of its inputs depending on the control signals applied by a decoder circuit 128.

The input signals of the decoder circuit 128 are derived from the signal Vi. For this purpose the control circuit 110 comprises a delay circuit 125, for example a flip-flop controlled by the clock signal Cl1, which flip-flop delays the signal Vi by a time interval corresponding to one bit length. The delayed signal is designated Vi'. The delayed signal Vi' is applied to an input of a two-input AND gate 127 via an inverter circuit 126. The signal Vi is applied to the other input of the AND gate 127, so that the output signal of the AND gate 127 indicates whether the first bit of the signal Vi is the first logic "1" bit of a sequence of logic "1" bits.

The output signal of the AND gate 127 and the signal Vi are applied to the inputs of the decoder circuit 128, which depending on the bit combination represented by the applied signals controls the multiplex circuit 123 in such a way that the output of the converter 120 is connected to the output 124 if the output signal of the AND gate 127 has the logic value "1", the output of the converter 121 is connected to the output 124 if the output signal of the AND gate 127 has the logic value "0" and the logic value of the signal Vi is "1", and the output 124 is connected to the input carrying the logic "0" signal if the logic value of the signal Vi is "0".

The system shown in FIG. 15 operates as follows. If a signal Vi is to be recorded, the read/write head 30 is positioned opposite the track portion in which the recording is to be made.

Moreover, the write intensity is adjusted to the desired value by the microcomputer system 40, by loading the digital-to-analog converter 113 with a value corresponding to the desired write intensity and stored in the memory of the microcomputer 40, after the adjustment information has been read from the lead-in track 37a. Moreover, the control circuit 110 is set in conformity with the adjustment information thus read and stored in the memory. Finally, the read/write head 30 is set to the write mode, after which recording begins.

During recording the signal Vi is converted into the signal Vs. In response to a clock pulse of the clock signal Cl1 the bit combinations on the parallel inputs are loaded into the parallel-serial converters 120 and 121 in FIG. 17 of the bit frequency of the signal Vi and subsequently the contents of the converters 120 and 121 is read out serially at the clock frequency cl3, which is three times as high. When the first logic "1" bit of a sequence of logic "1" bits of the signal Vi is applied to the control circuit 110, the bit pattern which has been loaded into the parallel-serial converter 120 is transferred as the write signal Vs by the multiplex circuit 123. This bit pattern depends on the setting of the control circuit, which can be "000" (see Vsa FIG. 18), "001" (see Vsb in FIG. 18), or "010" (see Vsc in FIG. 18). For the second and subsequent logic "1" bits in the sequence of logic "1" bits of the signal Vi the bit pattern "010" from the serial-parallel converter 121 is transferred as the write signal Vs by the multiplex circuit 123. For every logic "0" bit of the signal Vi a logic "0" signal is transferred to the input of the multiplex circuit 123.

Figure 18:
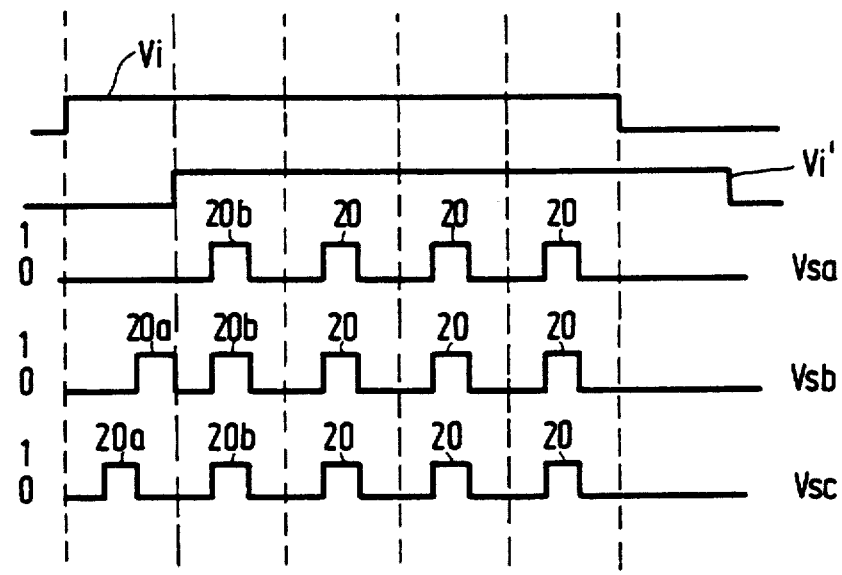
FIG. 18 shows an example of a number of write signal waveforms generated by the control circuit of FIG. 17 for different settings of the control circuit.
Figure 1:
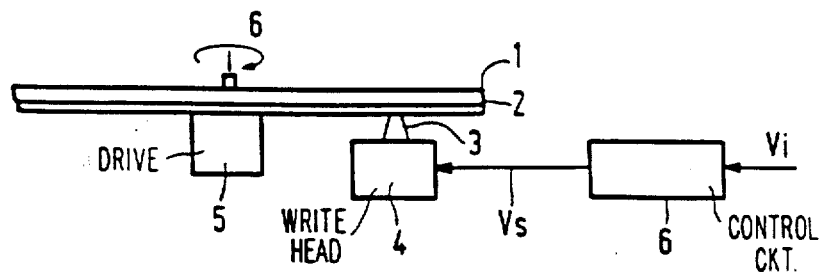
Figure 2:
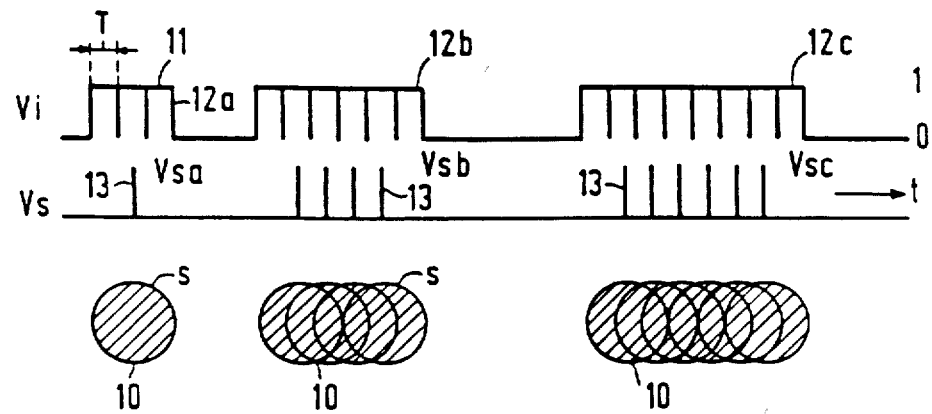
Figure 3:
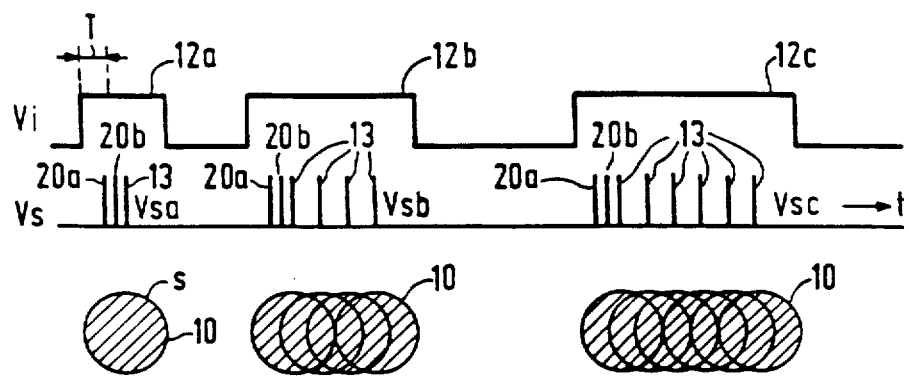
Figure 4:
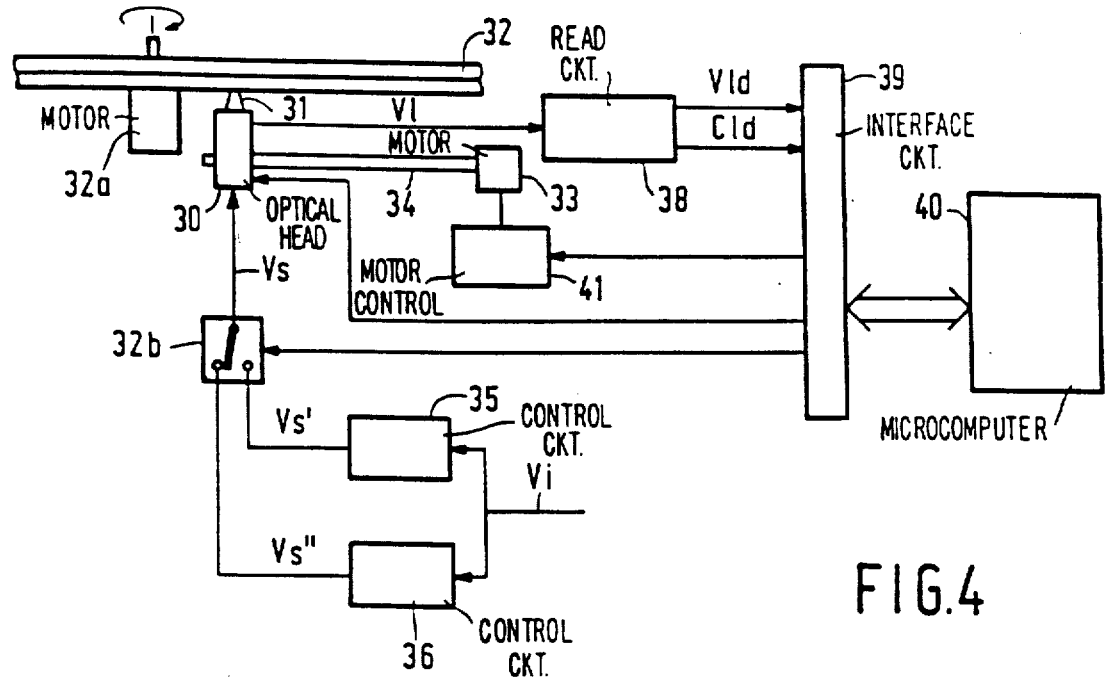
Figure 5A:
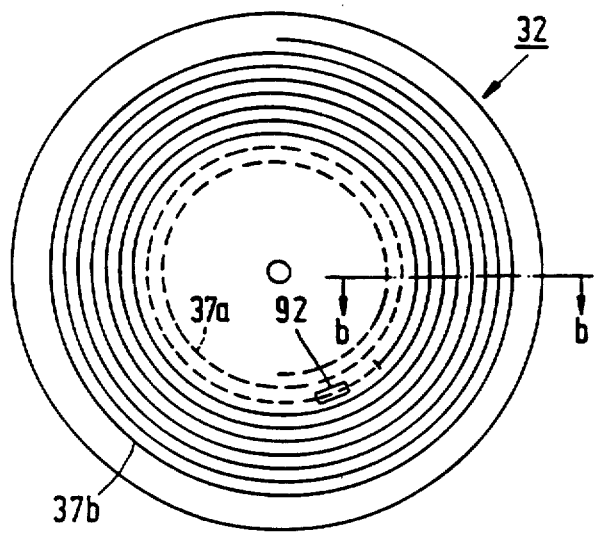
Figure 5B:
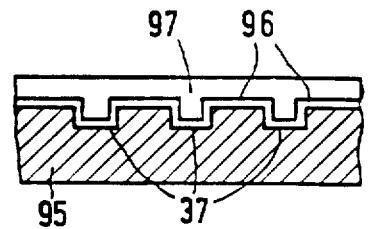
Figure 5C:
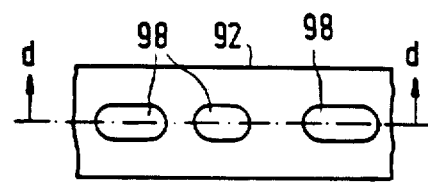
Figure 5D:
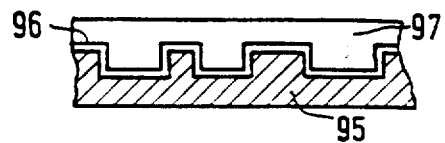
Figure 6:
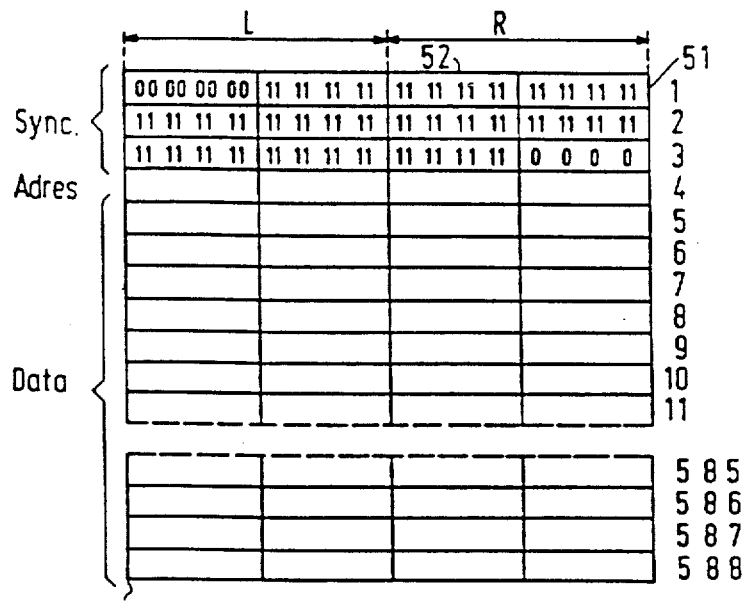
Figure 7:
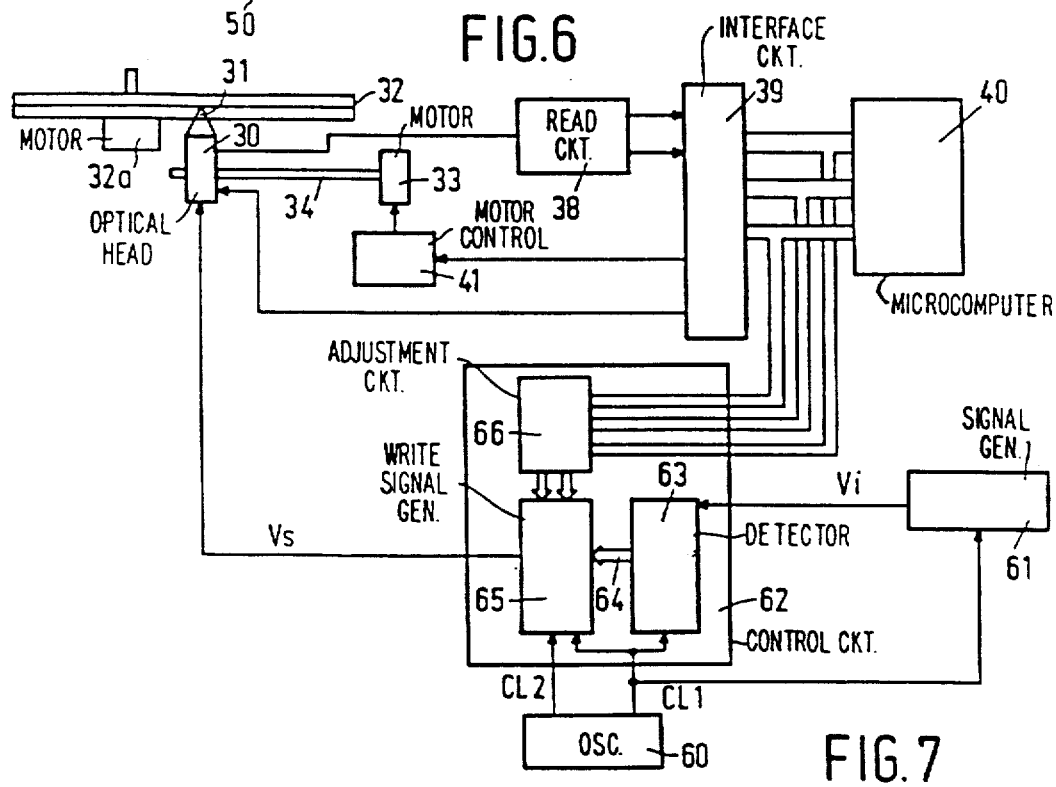
Figure 8:
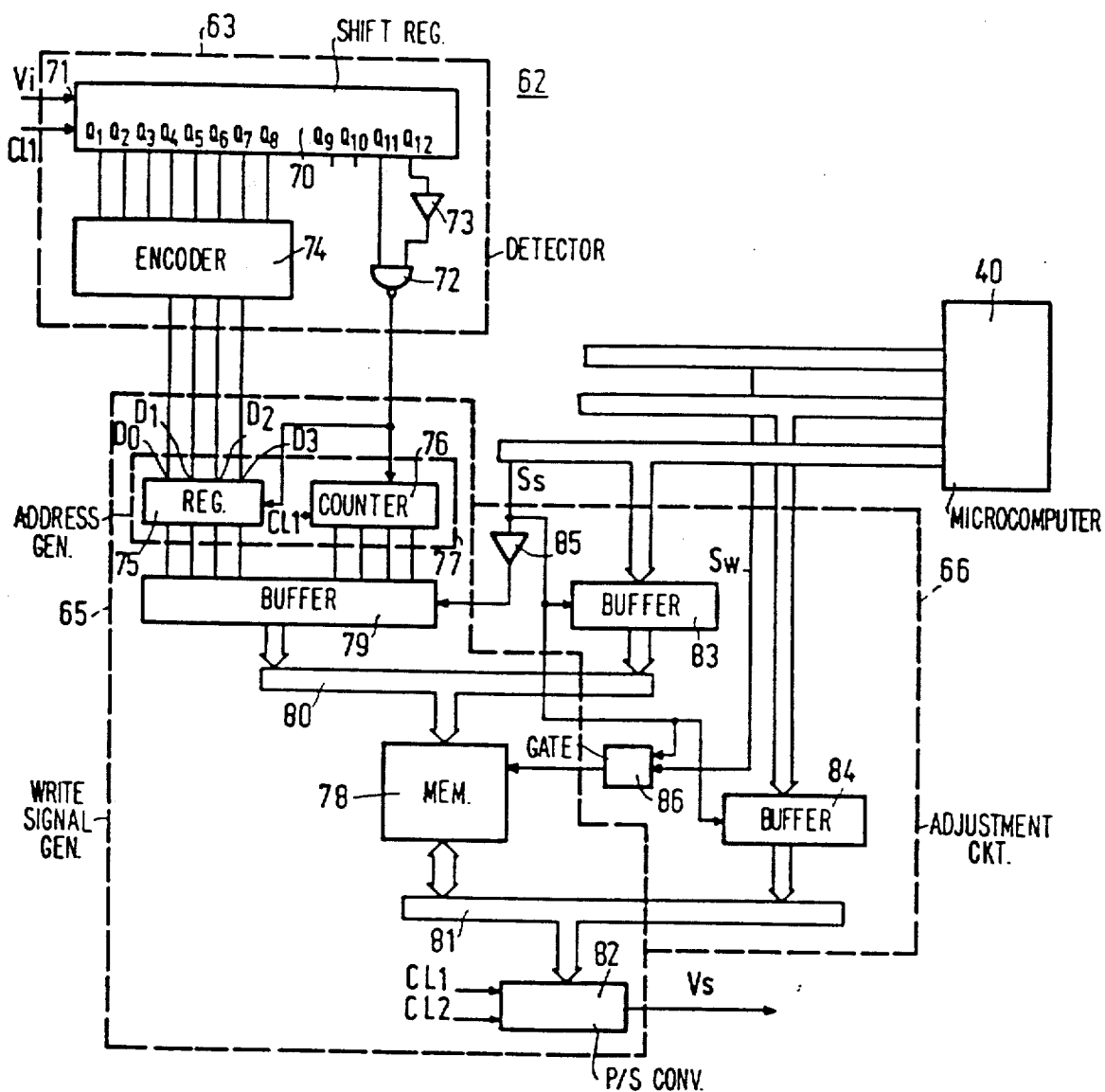
Figure 11:
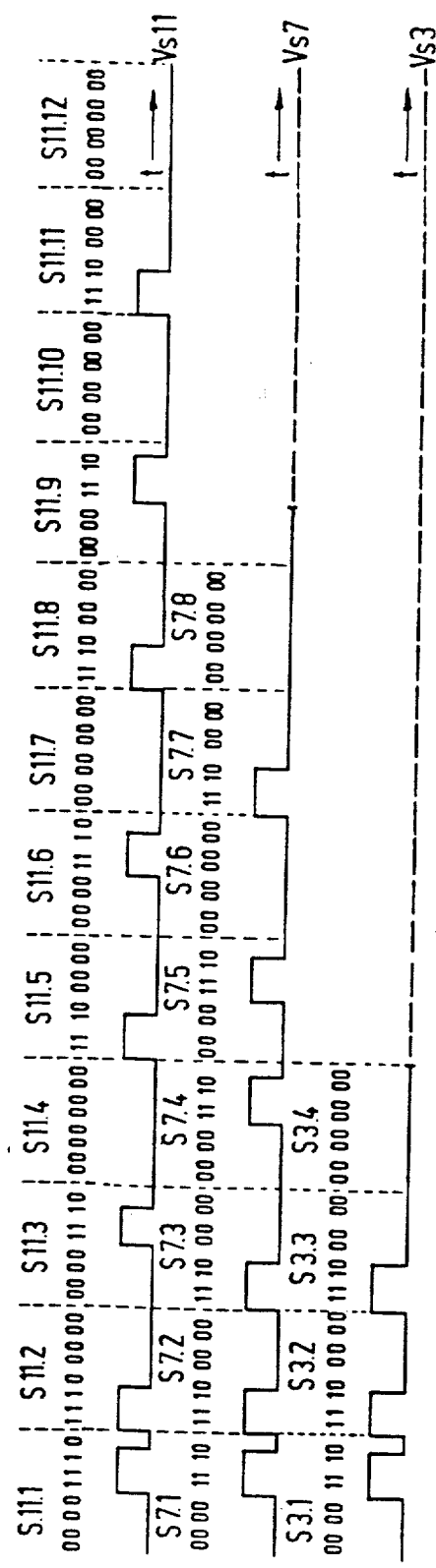
Figure 13:
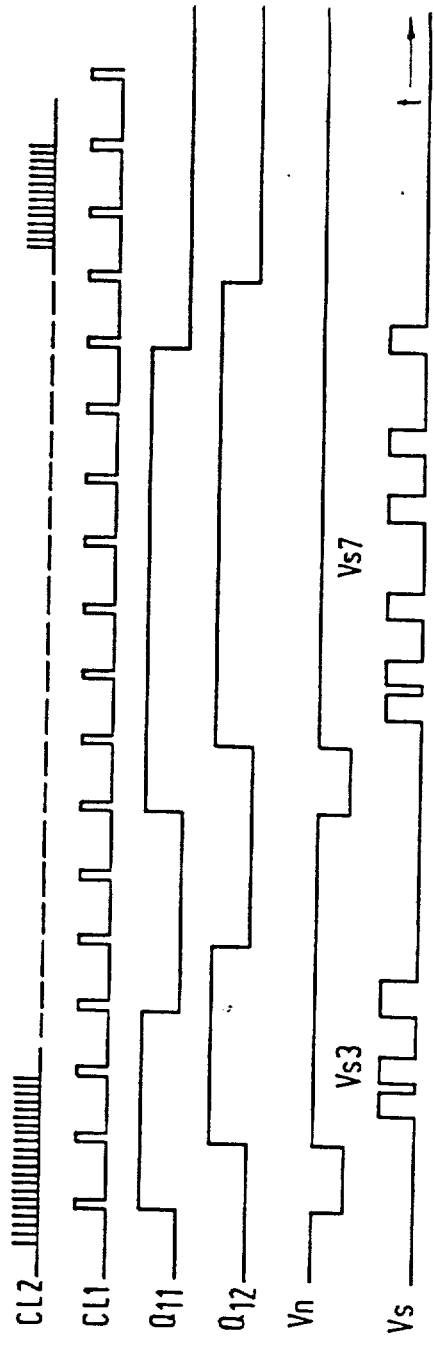
Figure 14:
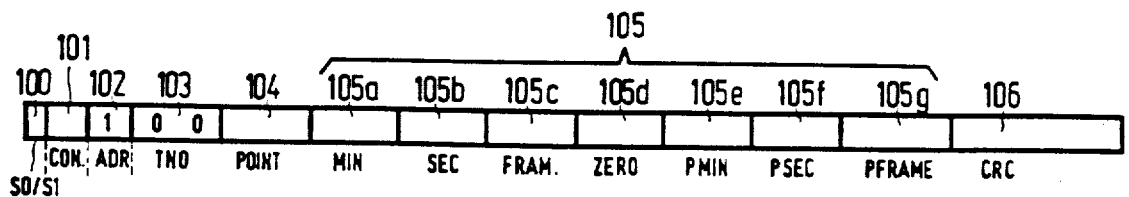
Figure 15:
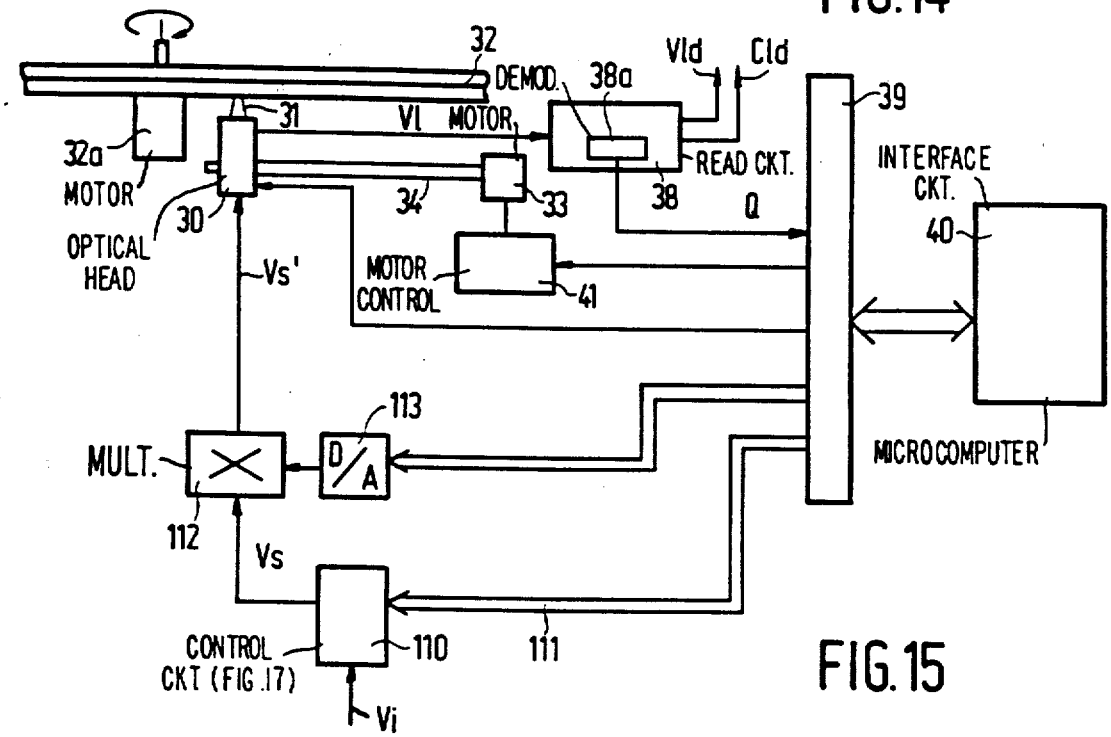
Figure 16:
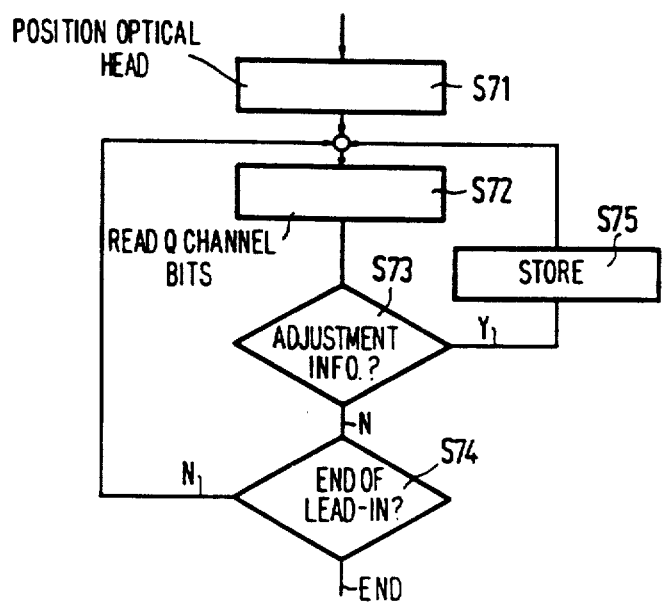
Figure 17:
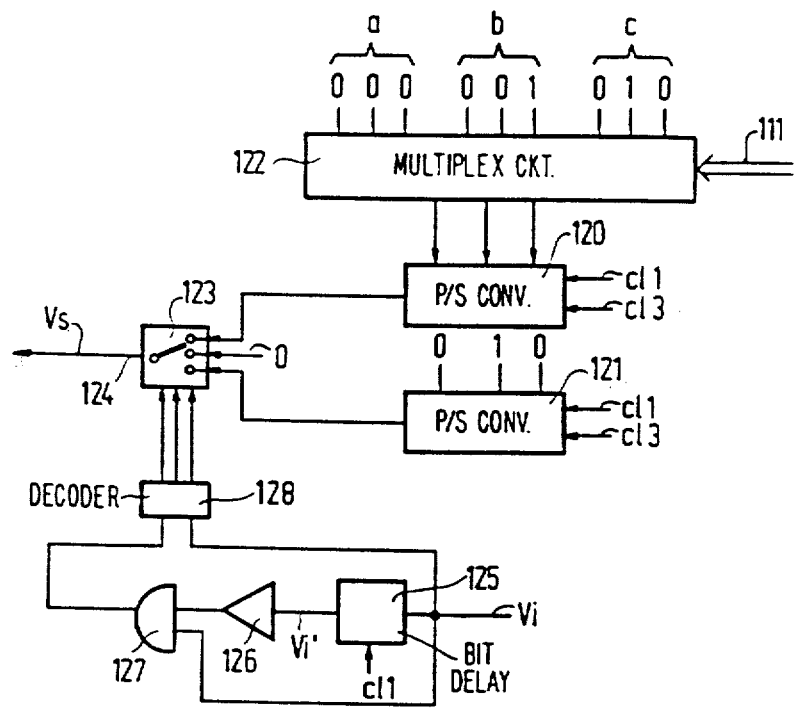
Figure 18:
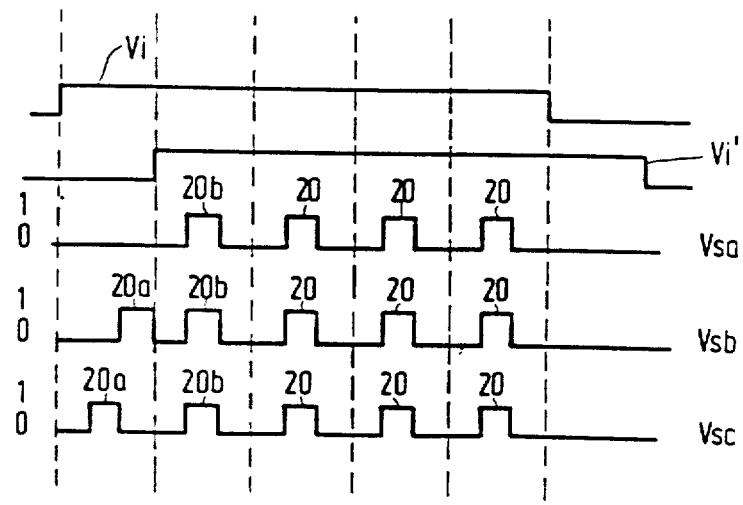

FIG. 18 shows the write signal waveform for three different settings of the control circuit 110, the signal Vsa being the write signal in the case that the "a" input of the multiplex circuit 122 is selected, the signal Vsb being the write signal if the "b" input of the multiplex circuit 122 is selected, and the signal Vsc being the write signal if the "c" input is selected. The pulses 20 are the three write pulses corresponding to an information signal Vi shown as having five successive "1" bit cells. The pulses 20a and 20b again are the leader pulses to compensate for occurrence of thermal effects in different kinds of recording layers of the record carrier employed in the recording system.

Owing to the possibility of adjusting the write intensity and the possibility to choose from the three different pulse patterns shown in FIG. 18 it is possible to provide compensation for the thermal effects occurring during recording for a very large number of different record-carrier types.

In the foregoing the invention has been illustrated for a recording of EFM signals. However, the scope of the invention is not limited to this example. It will be obvious to those skilled in the art that the invention may also be applied to recordings of information signals of other types, in which case other write signal waveforms are required depending on the type of record carrier.

Finally, it is to be noted that, although the invention has been described for an optical recording system, the invention may also be employed in other recording systems, such as for example magnetic and magneto-optical recording systems, in which the desired write-signal waveforms may also depend on the type of record carrier used.

What is claimed is:

1. A system for recording a digital information signal on an optical record carrier, the information signal being in the form of successive sequences of bits of the same logic value, each such bit sequence being recorded as a recording mark of modified optical properties on the record carrier having a length corresponding to the number of bits in the bit sequence; said system comprising:

a record carrier having optically readable adjustment information thereon signifying whether a sequence of write pulses for recording a bit sequence should include write pulses in addition to write pulses corresponding to the bits of the bit sequence in order to produce on the record carrier a recording mark which correctly represents said bit sequence, said adjustment information further signifying the number and relative positions of such additional write pulses in the complete write pulse sequence; and recording apparatus comprising read means for reading the adjustment information from the record carrier prior to recording an information signal thereon, and a control circuit which in accordance with the so-read adjustment information converts each of said bit sequences into a sequence of write pulses for producing a corresponding recording mark on the record carrier;

said control circuit comprising:

a write pulse generator for converting each successive bit sequence of the information signal into a sequence of write pulses for producing a recording mark on the record carrier constituted by a series of overlapping sub-marks formed by the respective write pulses; and adjusting means responsive to said adjustment information read from the record carrier to control said write pulse generator so that each sequence of write pulses for a bit sequence includes, in addition to pulses corresponding to the bits of such bit sequence, additional pulses of a number and at positions in the write pulse sequence as signified by said adjustment information.

2. A recording system as claimed in claim 1, wherein the optically readable adjustment information on said record carrier further signifies the intensity of a radiation beam for producing said recording marks thereon; said read means comprises an optical read/write head to which said write pulses are supplied and which is adapted to produce a radiation beam which scans said record carrier to form said overlapping sub-marks thereon in accordance with said write pulses; said adjusting means is responsive to the adjustment information read by said read means to control said write pulse generator so that the intensity of the write pulses produced thereby is in conformity with said adjustment information; and said write pulses modulate the intensity of the radiation beam produced by said optical head in accordance with the intensity of such pulses.

3. A system as claimed in claim 1, wherein said control circuit further comprises a detector circuit for detecting the number of bits in each of said successive bit sequences of the information signal and producing detection signals signifying such numbers of bits, and said adjustment circuit is responsive to said detection signals to control said write pulse generator so that the number of pulses in each sequence of write pulses produced thereby is in accordance with the number of bits in the corresponding bit sequence and a number of additional pulses signified by said adjustment information.

4. A system as claimed in claim 3, characterized in that the write pulse generator comprises a memory for the storage of different sequences of write pulses and means for reading-out such sequences in accordance with the detection signals, and in that the adjustment circuit comprises a circuit for loading the memory with the sequences of write pulses in conformity with the adjustment information read from the record carrier.

5. A system as claimed in claim 1, further characterized in that said read means comprises an optical read/write head to which said write pulses are supplied and which in response thereto produces radiation pulses which form said overlapping recording sub-marks on said record carrier; said additional pulses in each of said sequences of write pulses preceding the other write pulses in such sequence so as to cause said optical head to produce pre-heating radiation pulses which compensate for thermal effects produced in the record carrier by said recording sub-marks.

6. A system as claimed in claim 1, characterized in that the adjustment information on the record carrier is a preformed information structure in a predetermined portion of a servo track thereon, and said recording apparatus comprises control means for causing said read means to read the adjustment information from said predetermined portion of said servo track before information is recorded on the record carrier.

7. A system as claimed in claim 6, characterized in that the predetermined servo-track portion is a lead-in portion situated at the beginning of the servo-track.

8. A system as claimed in claim 7, characterized in that a standard EFM signal, comprising a subcode signal including a Q-channel signal, is recorded in the predetermined servo-track portion; the adjustment information is included in the Q-channel signal; and in that the read means comprises an EFM subcode demodulator for recovering the Q-channel signal from the EFM signal being read and means for extracting the adjustment information from the Q-channel signal.

9. A system as claimed in claim 8, characterized in that the position of the adjustment information in the Q-channel signal is indicated by a unique bit combination at predetermined bit positions in such signal, the read means comprising detection means for detecting the unique bit combination and in response thereto to derive the adjustment information from the Q-channel signal.

10. Apparatus for recording a digital information signal on an optical record carrier having a recording layer with a predetermined optical property, the information signal being in the form of successive sequences of bits of the same logic value, each such bit sequence being recorded as a recording mark on said recording layer wherein said optical property is modified and having a length corresponding to the number of bits in such bit sequence; the optical record carrier having optically readable adjustment information thereon signifying whether a sequence of write pulses for recording a bit sequence should include, in addition to pulses corresponding to the bits of the bit sequence, additional pulses in order to produce on the record carrier a recording mark which correctly represents such bit sequence, the adjustment information further signifying the number and relative positions of such additional pulses in the complete write pulse sequence; said apparatus comprising:

read means including a read/write optical head for reading the adjustment information from the record carrier prior to recording information thereon; and a control circuit which in accordance with the so-read adjustment information converts each of said bit sequences into a sequence of write pulses for producing a corresponding recording mark on said record carrier; said control circuit comprising:

a write pulse generator for supplying to said optical head successive sequences of write pulses corresponding to successive bit sequences of the information signal, each write pulse sequence causing said optical head to form a sequence of submarks on said record carrier which overlap to form a recording mark representing the corresponding bit sequence of the information signal, each write pulse corresponding to a predetermined number of successive bits in said bit sequence; and adjusting means responsive to said adjustment information read from said record carrier to further control said write pulse generator so that each sequence of write pulses produced thereby includes additional pulses, the number and relative positions of such additional pulses in a write pulse sequence being as signified by said adjustment information.

11. Recording apparatus as claimed in claim 10, wherein said write pulse generator comprises a memory for storing different sequences of write pulses and means for reading out any of such stored sequences under the control of said detection signals.

12. Recording apparatus as claimed in claim 11, wherein said adjusting means is adapted to load said memory with said different sequences of write pulses.

13. An optical record carrier comprising a recording layer having a predetermined optical property and on which layer an information signal can be recorded in the form of recording marks wherein said optical property is modified, the information signal being in the form of successive sequences of bits of the same logic value, the record carrier having a servo track preformed thereon for guiding the recording of said marks along such track; characterized in that the record carrier includes in a predetermined portion of said servo track adjustment information signifying whether a sequence of write pulses for recording a bit sequence should include additional pulses in order to produce on the record carrier a recording mark which correctly represents said bit sequence, said adjustment information further signifying the number and relative positions of said additional pulses in a write pulse sequence.

14. An optical record carrier as claimed in claim 13, characterized in that the predetermined portion of the servo track is a lead-in portion at the beginning of the servo track.

15. An optical record carrier as claimed in claim 14, characterized in that a standard EFM signal, comprising a subcode signal which includes a Q-channel signal, is recorded in said predetermined track portion and the adjustment information is included in said Q-channel signal.

16. An optical record carrier as claimed in claim 15, characterized in that the position of the adjustment information in the Q-channel signal is indicated by a unique bit combination at predetermined bit positions in such signal.

* * * * *

UNITED STATES PATENT AND TRADEMARK OFFICE
CERTIFICATE OF CORRECTION

PATENT NO.  : 5,001,692

DATED       : March 19, 1991

INVENTOR(S) : Martin A.J.P. Faria, et al.

It is certified that error appears in the above-identified patent and that said Letters Patent is hereby corrected as shown below:

The title page, should be deleted to appear as per attached title page.

The sheets of drawings consisting of figures 1-9, should be deleted to appear as per attached figures 1-18.

Signed and Sealed this

Twenty-second Day of February, 1994

*Attest:*

BRUCE LEHMAN

*Attesting Officer*    *Commissioner of Patents and Trademarks*

United States Patent [19]

Farla et al.

[11] Patent Number: 5,001,692
[45] Date of Patent: Mar. 19, 1991

[54] OPTICAL RECORDING SYSTEM PROVIDING A RECORDING SIGNAL WAVEFORM ADAPTED TO THE RECORDING CHARACTERISTICS OF THE RECORD CARRIER, AND RECORDING APPARATUS AND RECORD CARRIER FOR USE IN SUCH SYSTEMS

[75] Inventors: Martin A. J. P. Farla, Nuenen; Henricus T. L. P. Stockx, Someren; Johannes J. Mons, Eindhoven; Wilhelmus P. M. Raaymakers, Bois-le-Duc; Fransiscus L. J. M. Kuijpers, Eindoven, all of Netherlands

[73] Assignees: U.S. Philips Corporation, Philips DuPont. both of New York, N.Y.

[21] Appl. No.: 538,587
[22] Filed: Jun. 14, 1990

Related U.S. Application Data

[63] Continuation of Ser. No. 179,107, Apr. 8, 1988, abandoned.

[30] Foreign Application Priority Data

Apr. 21, 1987 [NL] Netherlands .......................... 8700934
Jan. 29, 1988 [NL] Netherlands .......................... 8800223

[51] Int. Cl.⁵ ................................................. G11B 7/00
[52] U.S. Cl. .......................................... 369/48; 369/116
[58] Field of Search ....................... 369/48, 49, 50, 111, 369/116, 278, 292, 124, 275.1, 275.4, 59

[56] References Cited

U.S. PATENT DOCUMENTS

| | | | |
|---|---|---|---|
| 4,488,277 | 12/1984 | McFarlane et al. | 369/48 |
| 4,538,257 | 8/1985 | Klinger | 369/54 |
| 4,796,250 | 1/1989 | Kobayashi et al. | 369/116 |
| 4,841,506 | 6/1989 | Kiyoura et al. | 369/32 |
| 4,873,680 | 10/1989 | Chung et al. | 369/116 |

FOREIGN PATENT DOCUMENTS

| | | | |
|---|---|---|---|
| 59-42653 | 3/1984 | Japan | 369/275 |
| 59-60742 | 4/1984 | Japan . | |
| 60-160082 | 8/1985 | Japan | 369/292 |
| 61-180935 | 8/1986 | Japan | 369/48 |
| 61-243974 | 10/1986 | Japan . | |
| 61-260438 | 11/1986 | Japan . | |
| 61-260439 | 11/1986 | Japan . | |

Primary Examiner—Donald McElheny, Jr.
Attorney, Agent, or Firm—Leroy Eason

[57] ABSTRACT

An optical recording system wherein the record carrier is pre-recorded with adjustment information indicative of the waveform of the write signal ($V_s$) to be employed for recording an information signal ($V_i$) thereon. The recording apparatus includes a read/write head for reading the adjustment information before recording, and a control circuit for deriving the write signal ($V_s$) from the information signal ($V_i$). The control circuit includes an adjustment circuit which selects a write signal waveform in conformity with the adjustment information read from the record carrier.

16 Claims, 9 Drawing Sheets

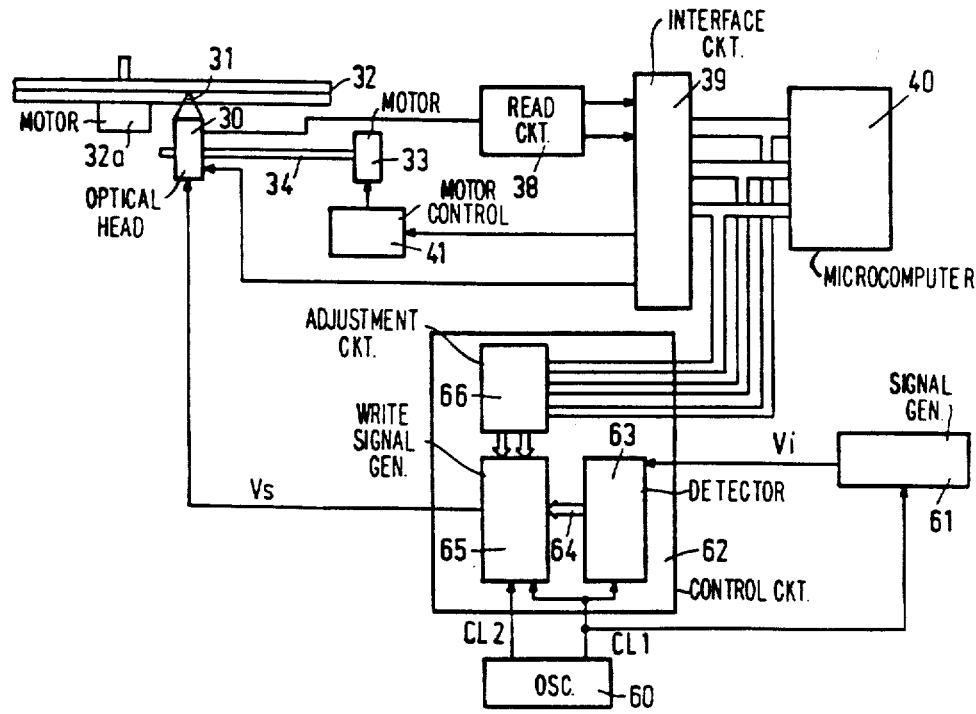

| $a_1$ | $a_2$ | $a_3$ | $a_4$ | $a_5$ | $a_6$ | $a_7$ | $a_8$ | $D_0$ | $D_1$ | $D_2$ | $D_3$ |
|---|---|---|---|---|---|---|---|---|---|---|---|
| X | X | X | X | X | X | X | 0 | 0 | 0 | 0 | 0 |
| X | X | X | X | X | X | 0 | 1 | 0 | 0 | 0 | 1 |
| X | X | X | X | X | 0 | 1 | 1 | 0 | 0 | 1 | 0 |
| X | X | X | X | 0 | 1 | 1 | 1 | 0 | 0 | 1 | 1 |
| X | X | X | 0 | 1 | 1 | 1 | 1 | 0 | 1 | 0 | 0 |
| X | X | 0 | 1 | 1 | 1 | 1 | 1 | 0 | 1 | 0 | 1 |
| X | 0 | 1 | 1 | 1 | 1 | 1 | 1 | 0 | 1 | 1 | 0 |
| 0 | 1 | 1 | 1 | 1 | 1 | 1 | 1 | 0 | 1 | 1 | 1 |
| 1 | 1 | 1 | 1 | 1 | 1 | 1 | 1 | 1 | 1 | 1 | 1 |

FIG.9

| ADRES | | | Vs |
|---|---|---|---|
| 0 0 | — | 0 4 | Vs 3 |
| 1 0 | — | 1 5 | Vs 4 |
| 2 0 | — | 2 6 | Vs 5 |
| 3 0 | — | 3 7 | Vs 6 |
| 4 0 | — | 4 8 | Vs 7 |
| 5 0 | — | 5 9 | Vs 8 |
| 6 0 | — | 6 A | Vs 9 |
| 7 0 | — | 7 B | Vs 10 |
| F 0 | — | F C | Vs 11 |

FIG.10

| | | | | |
|---|---|---|---|---|
| Sync { | 00 00 00 00 | 11 11 11 11 | 11 11 11 11 | 11 11 11 11 | 1 |
| | 11 11 11 11 | 11 11 11 11 | 11 11 11 11 | 11 11 11 11 | 2 |
| Adres { | 11 11 11 11 | 11 11 11 11 | 11 11 11 11 | 00 00 00 00 | 3 |
| | AC 1 | AC 2 | AC 3 | AC 4 | 4 |
| Ys3 { | S 3.1 | S 3.2 | S 3.3 | S 3.4 | 5 |
| | 0 | 0 | 0 | 0 | 6 |
| | 0 | 0 | 0 | 0 | 7 |
| | 0 | 0 | 0 | 0 | 8 |
| Ys4 { | S 4.1 | S 4.2 | S 4.3 | S 4.4 | 9 |
| | S 4.5 | 0 | 0 | 0 | 10 |
| | 0 | 0 | 0 | 0 | 11 |
| | 0 | 0 | 0 | 0 | 12 |
| Ys5 { | S 5.1 | S 5.2 | S 5.3 | S 5.4 | 13 |
| | S 5.5 | S 5.5 | 0 | 0 | 14 |
| | 0 | 0 | 0 | 0 | 15 |
| | 0 | 0 | 0 | 0 | 16 |
| Ys6 { | S 6.1 | S 6.2 | S 6.3 | S 6.4 | 17 |
| | S 6.5 | S 6.6 | S 6.7 | 0 | 18 |
| | 0 | 0 | 0 | 0 | 19 |
| | 0 | 0 | 0 | 0 | 20 |
| Ys7 { | S 7.1 | S 7.2 | S 7.3 | S 7.4 | 21 |
| | S 7.5 | S 7.6 | S 7.7 | S 7.8 | 22 |
| | 0 | 0 | 0 | 0 | 23 |
| | 0 | 0 | 0 | 0 | 24 |
| Ys8 { | S 8.1 | S 8.2 | S 8.3 | S 8.4 | 25 |
| | S 8.5 | S 8.6 | S 8.7 | S 8.8 | 26 |
| | S 8.9 | 0 | 0 | 0 | 27 |
| | 0 | 0 | 0 | 0 | 28 |
| Ys9 { | S 9.1 | S 9.2 | S 9.3 | S 9.4 | 29 |
| | S 9.5 | S 9.6 | S 9.7 | S 9.8 | 30 |
| | S 9.9 | S 9.10 | 0 | 0 | 31 |
| | 0 | 0 | 0 | 0 | 32 |
| Ys10 { | S 10.1 | S 10.2 | S 10.3 | S 10.4 | 33 |
| | S 10.5 | S 10.6 | S 10.7 | S 10.8 | 34 |
| | S 10.9 | S 10.10 | S 10.11 | 0 | 35 |
| | 0 | 0 | 0 | 0 | |
| Ys11 { | S 11.1 | S 11.2 | S 11.3 | S 11.4 | 64 |
| | S 11.5 | S 11.6 | S 11.7 | S 11.8 | 65 |
| | S 11.9 | S 11.10 | S 11.11 | S 11.12 | 66 |
| | 0 | 0 | 0 | 0 | 67 |
| | | | | | 587 |
| | | | | | 587 |
| | | | | | 588 |

FIG.12